United States Patent
Sinyagin et al.

(10) Patent No.: US 9,367,435 B2
(45) Date of Patent: Jun. 14, 2016

(54) INTEGRATION TESTING METHOD AND SYSTEM FOR WEB SERVICES

(71) Applicant: Vertafore, Inc., Bothell, WA (US)

(72) Inventors: Aleksey Sinyagin, Redmond, WA (US); Justin P. Vinall, Shoreline, WA (US); Fang Wang, Bellevue, WA (US)

(73) Assignee: VERTAFORE, INC., Bothell, WA (US)

( * ) Notice: Subject to any disclaimer, the term of this patent is extended or adjusted under 35 U.S.C. 154(b) by 0 days.

(21) Appl. No.: 14/104,749

(22) Filed: Dec. 12, 2013

(65) Prior Publication Data

US 2015/0169432 A1 Jun. 18, 2015

(51) Int. Cl.
G06F 9/44 (2006.01)
G06F 11/36 (2006.01)

(52) U.S. Cl.
CPC .................................. *G06F 11/3684* (2013.01)

(58) Field of Classification Search
None
See application file for complete search history.

(56) References Cited

U.S. PATENT DOCUMENTS

| | | | |
|---|---|---|---|
| 3,970,992 A | 7/1976 | Boothroyd et al. |
| 4,346,442 A | 8/1982 | Musmanno |
| 4,347,568 A | 8/1982 | Giguere et al. |
| 4,359,631 A | 11/1982 | Lockwood et al. |
| 4,383,298 A | 5/1983 | Huff et al. |
| 4,410,940 A | 10/1983 | Carlson et al. |
| 4,429,360 A | 1/1984 | Hoffman et al. |
| 4,486,831 A | 12/1984 | Wheatley et al. |
| 4,491,725 A | 1/1985 | Pritchard |
| 4,503,499 A | 3/1985 | Mason et al. |
| 4,553,206 A | 11/1985 | Smutek et al. |
| 4,567,359 A | 1/1986 | Lockwood |
| 4,591,974 A | 5/1986 | Dornbush et al. |
| 4,598,367 A | 7/1986 | DeFrancesco et al. |
| 4,633,430 A | 12/1986 | Cooper |
| 4,642,768 A | 2/1987 | Roberts |
| 4,646,229 A | 2/1987 | Boyle |

(Continued)

FOREIGN PATENT DOCUMENTS

| | | |
|---|---|---|
| CA | 2646167 A1 | 10/2007 |
| CA | 2649441 A1 | 10/2007 |

(Continued)

OTHER PUBLICATIONS

Ranjan, Praveen. "Automated Software Testing Using Metahurestic Technique Based on an Ant Colony Optimization." Electronic System Design (ISED) Dec. 20-22, 2010: 235-40. Print.*

(Continued)

*Primary Examiner* — Wei Zhen
*Assistant Examiner* — Binh Luu
(74) *Attorney, Agent, or Firm* — Seed IP Law Group PLLC

(57) ABSTRACT

A method of testing a web service includes obtaining web service metadata from the web service. Test cases are generated automatically using the web service metadata, heuristic algorithm modules selected based on the contents of the web service metadata, and stochastic processes. Energy selection logic is used to update test parameters included in the test cases between rounds of testing until a set of test cases is generated that produces test results meeting one or more predetermined criteria. Testing is performed periodically using that set of test cases until the test results indicate that the web service has changed. New test cases are automatically generated and used to test the web service until test results meet the one or more predetermined criteria.

42 Claims, 8 Drawing Sheets

(56) References Cited

U.S. PATENT DOCUMENTS

| | | |
|---|---|---|
| 4,646,231 A | 2/1987 | Green et al. |
| 4,646,250 A | 2/1987 | Childress |
| 4,648,037 A | 3/1987 | Valentino |
| 4,658,351 A | 4/1987 | Teng |
| 4,730,252 A | 3/1988 | Bradshaw |
| 4,794,515 A | 12/1988 | Hornung |
| 4,809,170 A | 2/1989 | Leblang et al. |
| 4,819,156 A | 4/1989 | DeLorme et al. |
| 4,831,526 A | 5/1989 | Luchs et al. |
| 4,845,644 A | 7/1989 | Anthias et al. |
| 4,860,247 A | 8/1989 | Uchida et al. |
| 4,912,628 A | 3/1990 | Briggs |
| 4,918,588 A | 4/1990 | Barrett et al. |
| 4,928,243 A | 5/1990 | Hodges et al. |
| 4,928,252 A | 5/1990 | Gabbe et al. |
| 4,949,251 A | 8/1990 | Griffin et al. |
| 4,951,194 A | 8/1990 | Bradley et al. |
| 4,959,769 A | 9/1990 | Cooper et al. |
| 4,985,831 A | 1/1991 | Dulong et al. |
| 5,072,412 A | 12/1991 | Henderson, Jr. et al. |
| 5,086,502 A | 2/1992 | Malcolm |
| 5,159,669 A | 10/1992 | Trigg et al. |
| 5,161,226 A | 11/1992 | Wainer |
| 5,170,480 A | 12/1992 | Mohan et al. |
| 5,175,853 A | 12/1992 | Kardach et al. |
| 5,201,033 A | 4/1993 | Eagen et al. |
| 5,220,665 A | 6/1993 | Coyle, Jr. et al. |
| 5,241,677 A | 8/1993 | Naganuma et al. |
| 5,257,375 A | 10/1993 | Clark et al. |
| 5,261,099 A | 11/1993 | Bigo et al. |
| 5,263,134 A | 11/1993 | Paal et al. |
| 5,265,159 A | 11/1993 | Kung |
| 5,282,052 A | 1/1994 | Johnson et al. |
| 5,317,733 A | 5/1994 | Murdock |
| 5,363,214 A | 11/1994 | Johnson |
| 5,448,729 A | 9/1995 | Murdock |
| 5,517,644 A | 5/1996 | Murdock |
| 5,530,861 A | 6/1996 | Diamant et al. |
| 5,537,315 A | 7/1996 | Mitcham |
| 5,553,282 A | 9/1996 | Parrish et al. |
| 5,583,922 A | 12/1996 | Davis et al. |
| 5,634,052 A | 5/1997 | Morris |
| 5,864,340 A | 1/1999 | Bertram et al. |
| 5,880,724 A | 3/1999 | Bertram et al. |
| 5,968,125 A | 10/1999 | Garrick et al. |
| 6,049,877 A | 4/2000 | White |
| 6,065,026 A | 5/2000 | Cornelia et al. |
| 6,128,653 A | 10/2000 | del Val et al. |
| 6,199,079 B1 | 3/2001 | Gupta et al. |
| 6,240,416 B1 | 5/2001 | Immon et al. |
| 6,247,020 B1 | 6/2001 | Minard |
| 6,271,846 B1 | 8/2001 | Martinez et al. |
| 6,272,678 B1 | 8/2001 | Imachi et al. |
| 6,301,592 B1 | 10/2001 | Aoyama et al. |
| 6,366,920 B1 | 4/2002 | Hoose et al. |
| 6,377,948 B2 | 4/2002 | Kikuchi et al. |
| 6,381,744 B2 | 4/2002 | Nanos et al. |
| 6,385,642 B1 | 5/2002 | Chlan et al. |
| 6,393,407 B1 | 5/2002 | Middleton, III et al. |
| 6,393,438 B1 | 5/2002 | Kathrow et al. |
| 6,405,238 B1 | 6/2002 | Votipka |
| 6,407,752 B1 | 6/2002 | Harnett |
| 6,430,575 B1 | 8/2002 | Dourish et al. |
| 6,437,803 B1 | 8/2002 | Panasyuk et al. |
| 6,463,343 B1 | 10/2002 | Emens et al. |
| 6,490,601 B1 | 12/2002 | Markus et al. |
| 6,510,430 B1 | 1/2003 | Oberwager et al. |
| 6,538,667 B1 | 3/2003 | Duursma et al. |
| 6,546,405 B2 | 4/2003 | Gupta et al. |
| 6,592,629 B1 | 7/2003 | Cullen et al. |
| 6,601,047 B2 | 7/2003 | Wang et al. |
| 6,658,167 B1 | 12/2003 | Lee et al. |
| 6,658,659 B2 | 12/2003 | Hiller et al. |
| 6,915,435 B1 | 7/2005 | Merriam |
| 6,918,082 B1 | 7/2005 | Gross et al. |
| 6,978,376 B2 | 12/2005 | Giroux et al. |
| 6,993,529 B1 | 1/2006 | Basko et al. |
| 6,993,661 B1 | 1/2006 | Garfinkel |
| 7,000,230 B1 | 2/2006 | Murray et al. |
| 7,010,503 B1 | 3/2006 | Oliver et al. |
| 7,020,779 B1 | 3/2006 | Sutherland |
| 7,028,223 B1 * | 4/2006 | Kolawa et al. ............. 714/38.14 |
| 7,146,495 B2 | 12/2006 | Baldwin et al. |
| 7,178,110 B2 | 2/2007 | Fujino |
| 7,191,195 B2 | 3/2007 | Koyama et al. |
| 7,206,998 B2 | 4/2007 | Pennell et al. |
| 7,266,537 B2 | 9/2007 | Jacobsen et al. |
| 7,299,202 B2 | 11/2007 | Swanson |
| 7,299,502 B2 | 11/2007 | Schmeling et al. |
| 7,318,193 B2 | 1/2008 | Kim et al. |
| 7,321,539 B2 | 1/2008 | Ballantyne |
| 7,322,025 B2 | 1/2008 | Reddy et al. |
| 7,372,789 B2 | 5/2008 | Kuroda |
| 7,421,438 B2 | 9/2008 | Turski et al. |
| 7,440,967 B2 | 10/2008 | Chidlovskii |
| 7,478,064 B1 | 1/2009 | Nacht |
| 7,574,048 B2 | 8/2009 | Shilman et al. |
| 7,584,196 B2 | 9/2009 | Reimer et al. |
| 7,587,327 B2 | 9/2009 | Jacobs et al. |
| 7,593,532 B2 | 9/2009 | Plotkin et al. |
| 7,624,189 B2 | 11/2009 | Bucher |
| 7,636,898 B2 | 12/2009 | Takahashi |
| 7,650,320 B2 | 1/2010 | Nakano |
| 7,676,792 B2 | 3/2010 | Irie et al. |
| 7,698,230 B1 | 4/2010 | Brown et al. |
| 7,757,168 B1 | 7/2010 | Shanahan et al. |
| 7,814,078 B1 | 10/2010 | Forman et al. |
| 7,886,046 B1 * | 2/2011 | Zeitoun et al. ............... 709/224 |
| 7,930,757 B2 | 4/2011 | Shapiro et al. |
| 7,949,711 B2 | 5/2011 | Chang et al. |
| 7,996,759 B2 | 8/2011 | Elkady |
| 8,140,589 B2 | 3/2012 | Petri |
| 8,146,058 B2 * | 3/2012 | Sarkar et al. .................. 717/124 |
| 8,166,388 B2 | 4/2012 | Gounares et al. |
| 8,171,404 B2 | 5/2012 | Borchers et al. |
| 8,234,219 B2 | 7/2012 | Gorczowski et al. |
| 8,266,592 B2 * | 9/2012 | Beto et al. ..................... 717/124 |
| 8,290,971 B2 | 10/2012 | Klawitter et al. |
| 8,321,483 B2 | 11/2012 | Serlet et al. |
| 8,370,403 B2 | 2/2013 | Matsuki |
| 8,438,045 B2 | 5/2013 | Erlanger |
| 8,458,582 B2 | 6/2013 | Rogers et al. |
| 8,650,043 B1 | 2/2014 | Phillips |
| 8,667,267 B1 | 3/2014 | Garcia et al. |
| 8,825,626 B1 | 9/2014 | Wallace et al. |
| 2001/0027420 A1 | 10/2001 | Boublik et al. |
| 2001/0032092 A1 | 10/2001 | Calver |
| 2002/0065879 A1 | 5/2002 | Ambrose et al. |
| 2002/0087602 A1 | 7/2002 | Masuda et al. |
| 2002/0120474 A1 | 8/2002 | Hele et al. |
| 2002/0120776 A1 | 8/2002 | Eggebraaten et al. |
| 2002/0138476 A1 | 9/2002 | Suwa et al. |
| 2002/0194033 A1 | 12/2002 | Huff |
| 2002/0194578 A1 | 12/2002 | Irie et al. |
| 2002/0198743 A1 | 12/2002 | Ariathurai et al. |
| 2003/0144887 A1 | 7/2003 | Debber |
| 2003/0191938 A1 | 10/2003 | Woods et al. |
| 2003/0212610 A1 | 11/2003 | Duffy et al. |
| 2004/0039757 A1 | 2/2004 | McClure |
| 2004/0059740 A1 | 3/2004 | Hanakawa et al. |
| 2004/0128182 A1 | 7/2004 | Pepoon et al. |
| 2004/0186750 A1 | 9/2004 | Surbey et al. |
| 2004/0193455 A1 | 9/2004 | Kellington |
| 2004/0220975 A1 | 11/2004 | Carpentier et al. |
| 2004/0230903 A1 | 11/2004 | Elza et al. |
| 2004/0236614 A1 | 11/2004 | Keith |
| 2004/0243969 A1 | 12/2004 | Kamery et al. |
| 2004/0255275 A1 * | 12/2004 | Czerwonka .................. 717/124 |
| 2004/0267578 A1 | 12/2004 | Pearson |
| 2005/0033988 A1 | 2/2005 | Chandrashekhar et al. |
| 2005/0071203 A1 | 3/2005 | Maus |
| 2005/0080804 A1 | 4/2005 | Bradshaw, Jr. et al. |
| 2005/0137928 A1 | 6/2005 | Scholl et al. |
| 2005/0144195 A1 | 6/2005 | Hesselink et al. |

(56) References Cited

U.S. PATENT DOCUMENTS

| | | | |
|---|---|---|---|
| 2006/0047540 A1 | 3/2006 | Hutten et al. | |
| 2006/0100912 A1 | 5/2006 | Kumar et al. | |
| 2006/0184452 A1 | 8/2006 | Barnes et al. | |
| 2006/0195491 A1 | 8/2006 | Nieland et al. | |
| 2006/0195494 A1 | 8/2006 | Dietrich | |
| 2006/0259524 A1 | 11/2006 | Horton | |
| 2007/0006222 A1 | 1/2007 | Maier et al. | |
| 2007/0016465 A1 | 1/2007 | Schaad | |
| 2007/0016829 A1* | 1/2007 | Subramanian et al. | 714/38 |
| 2007/0061154 A1 | 3/2007 | Markvoort et al. | |
| 2007/0067772 A1 | 3/2007 | Bustamante | |
| 2007/0160070 A1 | 7/2007 | Buchhop et al. | |
| 2007/0186066 A1 | 8/2007 | Desai et al. | |
| 2007/0186214 A1 | 8/2007 | Morgan | |
| 2007/0244921 A1 | 10/2007 | Blair | |
| 2007/0244935 A1 | 10/2007 | Cherkasov | |
| 2007/0245230 A1 | 10/2007 | Cherkasov | |
| 2007/0282927 A1 | 12/2007 | Polouetkov | |
| 2008/0002830 A1 | 1/2008 | Cherkasov et al. | |
| 2008/0010542 A1* | 1/2008 | Yamamoto | G06F 11/3672 714/38.1 |
| 2008/0040690 A1 | 2/2008 | Sakai | |
| 2008/0086499 A1* | 4/2008 | Wefers et al. | 707/102 |
| 2008/0091846 A1 | 4/2008 | Dang | |
| 2008/0120602 A1* | 5/2008 | Comstock et al. | 717/125 |
| 2009/0007077 A1* | 1/2009 | Musuvathi | G06F 11/3688 717/130 |
| 2009/0055242 A1 | 2/2009 | Rewari et al. | |
| 2009/0119133 A1 | 5/2009 | Yeransian et al. | |
| 2009/0199160 A1* | 8/2009 | Vaitheeswaran | G06F 11/3414 717/124 |
| 2009/0271779 A1 | 10/2009 | Clark | |
| 2009/0287746 A1 | 11/2009 | Brown | |
| 2009/0328171 A1 | 12/2009 | Bayus et al. | |
| 2010/0060926 A1 | 3/2010 | Smith et al. | |
| 2010/0064230 A1 | 3/2010 | Klawitter et al. | |
| 2010/0064258 A1 | 3/2010 | Gorczowski et al. | |
| 2010/0091317 A1 | 4/2010 | Williams et al. | |
| 2010/0161616 A1 | 6/2010 | Mitchell | |
| 2010/0179883 A1 | 7/2010 | Devolites | |
| 2010/0199263 A1* | 8/2010 | Clee et al. | 717/125 |
| 2010/0235392 A1 | 9/2010 | McCreight et al. | |
| 2011/0088014 A1* | 4/2011 | Becker | G06F 11/3684 717/125 |
| 2011/0145037 A1 | 6/2011 | Domashchenko et al. | |
| 2011/0153560 A1 | 6/2011 | Bryant et al. | |
| 2011/0161375 A1 | 6/2011 | Tedder et al. | |
| 2011/0173153 A1 | 7/2011 | Domashchenko et al. | |
| 2011/0184689 A1* | 7/2011 | Awedikian et al. | 702/123 |
| 2011/0184766 A1 | 7/2011 | Virdhagriswaran | |
| 2011/0270975 A1* | 11/2011 | Troup | 709/224 |
| 2011/0276875 A1 | 11/2011 | McCabe et al. | |
| 2011/0283177 A1 | 11/2011 | Gates et al. | |
| 2012/0150919 A1 | 6/2012 | Brown et al. | |
| 2012/0222014 A1* | 8/2012 | Peretz et al. | 717/125 |
| 2012/0232934 A1 | 9/2012 | Zhang et al. | |
| 2012/0271657 A1 | 10/2012 | Anderson et al. | |
| 2013/0024418 A1 | 1/2013 | Sitrick et al. | |
| 2013/0066901 A1 | 3/2013 | Marcelais et al. | |
| 2013/0073942 A1 | 3/2013 | Cherkasov | |
| 2013/0080760 A1* | 3/2013 | Li et al. | 713/100 |
| 2013/0152047 A1* | 6/2013 | Moorthi et al. | 717/124 |
| 2013/0282406 A1 | 10/2013 | Snyder et al. | |
| 2013/0282407 A1 | 10/2013 | Snyder et al. | |
| 2013/0282408 A1 | 10/2013 | Snyder et al. | |
| 2013/0290786 A1* | 10/2013 | Artzi et al. | 714/32 |
| 2014/0040867 A1* | 2/2014 | Wefers | G06F 11/3684 717/131 |
| 2014/0358938 A1 | 12/2014 | Billmaier et al. | |

FOREIGN PATENT DOCUMENTS

| | | |
|---|---|---|
| CA | 2761405 A1 | 6/2012 |
| CA | 2733857 A1 | 9/2012 |
| CA | 2737734 A1 | 10/2012 |
| EP | 0585192 A1 | 3/1994 |
| JP | 60-41138 A | 3/1985 |
| JP | 3-282941 A | 12/1991 |
| JP | 4-373026 A | 12/1992 |
| WO | 2007/120772 A2 | 10/2007 |
| WO | 2007/120773 A2 | 10/2007 |
| WO | 2007/120774 A2 | 10/2007 |
| WO | 2010/030675 A1 | 3/2010 |
| WO | 2010/030676 A1 | 3/2010 |
| WO | 2010/030677 A1 | 3/2010 |
| WO | 2010/030678 A1 | 3/2010 |
| WO | 2010/030679 A1 | 3/2010 |
| WO | 2010/030680 A1 | 3/2010 |

OTHER PUBLICATIONS

Yuan, Xun, and Atif M. Memon. "Using GUI run-time state as feedback to generate test cases." Software Engineering, 2007. ICSE 2007. 29th International Conference on. IEEE, 2007. <http://ieeexplore.ieee.org/stamp/stamp.jsp?tp=&arnumber=4222601>.*

"AMS Real-Time Getting Started Guide," AMS Services, Vertafore, Inc., 9 pages, 2008.

"VERITAS Replication Exec version 3.1 for Windows," Administrator's Guide, pp. i-20, 49-68, and 119-160, Dec. 2004, 100 pages.

"Update insurance template according to changes in policy," retrieved from https://www.google.com/?tbm=pts, on Sep. 24, 2012, 2 pages.

"Adobe Introduces Adobe Acrobat 3.0 Software," *PR Newswire*, Jun. 3, 1996, 3 pages.

"CoreData Inc. Announces Technology and Marketing Agreement with MobileStar Network Corp.," *Business Wire*, Aug. 26, 1998, 2 pages.

"CoreData Offers E-mail Connectivity for RemoteWorx," *Newsbytes News Network*, Sep. 18, 1998, 1 page.

"Free Sticky Notes software—Sticky Notes program MoRUN.net Sticker Lite," Jan. 11, 2006, retrieved from http://web.archive.org/web/20060112031435/http://www.sticky-notes.net/free/stickynotes.html, on Oct. 10, 2013, 2 pages.

"Internet lifts servers to 64 bits," *Electronic Engineering Times*, Dec. 23, 1996, 3 pages.

"NotesPlusPlus," Feb. 25, 2006, retrieved from http://web.archive.org/web/20060225020405/http://www.sharewareconnection.com/notesplusplus.htm, on Oct. 10, 2013, 2 pages.

"SPSS Unveils Aggressive Development Plans: 1999 Product Releases Will Focus on Scalability and Deployment Solutions for the Enterprise," *Business Wire*, Feb. 18, 1999, 3 pages.

"Windows XP: The Complete Reference: Using Files and Folders," Apr. 28, 2004, retrieved from http://web.archive.org/web/20040428222156/http://delltech.150m.com/XP/files/7.htm, on Oct. 10, 2013, 4 pages.

Alvarez, "Bit Level Comparator Systems and Methods," U.S. Appl. No. 14/101,905, filed Dec. 10, 2013, 57 pages.

Announcement, "Coming Attraction, AMS Invites you to a Special Sneak Preview," AMS Services, 1 page, Aug. 1, 2008.

Brochure, "AMS 360—Business Growth. Productivity. Proven Technology.," Vertafore, Inc., 8 pages, 2008.

Brown et al., "Agency Management System and Content Management System Integration," U.S. Appl. No. 61/422,090, filed Dec. 10, 2010, 54 pages.

Corriveau et al., "AMS Portal Server: Bridging the Gap Between Web Presentation and the Back Office," White Paper, AMS Services, 13 pages, 2008.

Extended European Search Report, dated Jul. 9, 2012, for Application No. 07755347.7, 8 pages.

Extended European Search Report, dated Jun. 14, 2012, for Application No. 07755348.5, 8 pages.

Extended European Search Report, dated Jun. 19, 2012, for Application No. 07755349.3, 8 pages.

Extended European Search Report, dated Jun. 14, 2012, for Application No. 07755350.1, 9 pages.

Fogel, "Open Source Development With CVS," Copyright 1999, 2000, retrieved from http://web.archive.org/web/20000815211634/http://cvsbook.red-bean.com/cvsbook.ps, on Oct. 10, 2013, 218 pages.

(56) References Cited

OTHER PUBLICATIONS

Gadia, "A Homogeneous Relational Model and Query Languages for Temporal Databases," *ACM Transactions on Database Systems* 13(4):418-448, Dec. 1988.

Gage, "Sun's 'objective' is to populate Java networks," *Computer Reseller News*, Apr. 15, 1996, p. 69, 2 pages.

International Search Report and Written Opinion, mailed Aug. 5, 2008, for PCT/US2007/009040, 7 pages.

International Search Report and Written Opinion, mailed Jul. 18, 2008, for PCT/US2007/009041, 8 pages.

International Search Report and Written Opinion, mailed Jul. 14, 2008, for PCT/US2007/009042, 6 pages.

International Search Report and Written Opinion, mailed Jul. 18, 2008, for PCT/US2007/009043, 9 pages.

Murdock, "Office Automation System for Data Base Management and Forms Generation," U.S. Appl. No. 07/471,290, filed Jan. 26, 1990, 163 pages.

Snodgrass et al., "Temporal Databases," IEEE Computer, Sep. 1986, pp. 35-42.

Snyder et al., "Apparatus, Method and Article to Provide an Insurance Workflow Management System," U.S. Appl. No. 13/598,297, filed Aug. 29, 2012, 86 pages.

* cited by examiner

INTEGRATION TESTING METHOD AND SYSTEM FOR WEB SERVICES

BACKGROUND

1. Technical Field

The present disclosure relates generally to software testing, and more particularly to automated testing of web services using a black-box testing methodology.

2. Description of the Related Art

Integration testing of web services can be problematic for a test developer. For example, as the internal functionality of the web services changes, a test developer must maintain a deep understanding of how a parent software application works to ensure that the web services are being structured appropriately and to ensure that all code paths are covered during integration testing. Accordingly, integration testing of web services can be a highly complex, inefficient, and costly undertaking.

Black-box testing methodologies have been developed for software applications, wherein test cases are developed by examining the functionality of the software applications without examining the internal structures or workings of the software applications. To reduce the costs associated with the development of web services, it can be desirable to develop black-box testing methodologies for integration testing of web services.

BRIEF SUMMARY

A method performed by at least one computer system that tests a web service may be summarized as including: obtaining web service metadata from the web service; automatically generating a first set of test cases at least in part based on the web service metadata obtained from the web service; automatically testing the web service using the first set of test cases; and automatically generating first learning data regarding the first set of test cases.

The first set of test cases may be automatically generated at least in part based on a name of a function included in the web service metadata obtained from the web service. The first set of test cases may be automatically generated at least in part based on a name of a variable included in the web service metadata obtained from the web service. The first set of test cases may be automatically generated at least in part based on a data type of a variable included in the web service metadata obtained from the web service. The first set of test cases may be automatically generated at least in part based on at least one constraint on a variable included in the web service metadata obtained from the web service. The at least one constraint on the variable may include at least one of: a minimum value, a maximum value, and a string length. The method may further include: selecting one of a plurality of predetermined sets of test parameters based on the web service metadata; and selecting a plurality of test parameters from the selected one of the plurality of predetermined sets of test parameters, wherein the first set of test cases is automatically generated using the selected plurality of test parameters. The method may further include: generating a plurality of random numbers, wherein the plurality of test parameters are selected from the selected one of the plurality of predetermined sets of test parameters using the plurality of random numbers. The method may further include: selecting one of a plurality of heuristic algorithm modules based on the web service metadata; and obtaining a plurality of test parameters using the selected one of the plurality of heuristic algorithm modules, wherein the first set of test cases is automatically generated using the obtained plurality of test parameters. The method may further include: generating a plurality of random numbers, wherein the selected one of the plurality of heuristic algorithm modules obtains the plurality of test parameters using the plurality of random numbers. The method may further include: automatically generating a second set of test cases at least in part based on the web service metadata obtained from the web service; automatically testing the web service using the second set of test cases; automatically generating second learning data regarding the second set of test cases; automatically determining, at least in part based on the first and the second learning data, whether a third set of test cases is to be generated at least in part based on the first or the second set of test cases; responsive to determining that the third set of test cases is to be generated at least in part based on the first set of test cases, automatically generating the third set of test cases at least in part based on the first set of test cases; and responsive to determining that the third set of test cases is to be generated at least in part based on the second set of test cases, automatically generating the third set of test cases at least in part based on the second set of test cases. The first learning data may be generated by associating each test case of the first set of test cases with at least one respective test metric, and the second learning data may be generated by associating each test case of the second set of test cases with at least one respective test metric, and the third set of test cases may be generated at least in part based on the first or the second learning data. The first learning data may be generated by associating each test case of the first set of test cases with at least one respective first code coverage metric and at least one respective first execution time metric, the second learning data may be generated by associating each test case of the second set of test cases with at least one respective second code coverage metric and at least one respective second execution time metric, and the third set of test cases may be generated at least in part based on the first or the second learning data. The method may further include: evaluating energy selection logic using the first and the second learning data, wherein a result of the evaluating of the energy selection logic is used to determine whether the third set of test cases is to be generated using the first or the second set of test cases. The evaluating of the energy selection logic may include: calculating the sum of a plurality of test metrics associated with the first set of test cases; calculating the sum of a plurality of test metrics associated with the second set of test cases; and calculating a ratio that includes the sum of the plurality of test metrics associated with the first set of test cases and the sum of the plurality of test metrics associated with the second set of test cases. The evaluating of the energy selection logic may further include: calculating the reciprocal of the sum of a plurality of test metrics associated with the first set of test cases; and calculating the reciprocal of the sum of a plurality of test metrics associated with the second set of test cases, wherein the ratio also includes the reciprocal of the sum of the plurality of test metrics associated with the first set of test cases and the reciprocal of the sum of the plurality of test metrics associated with the second set of test cases. The evaluating of the energy selection logic may further include: multiplying the ratio by a term that provides a bias for determining that the third set of test cases is to be generated based on one of the first set and the second set of test cases. The magnitude of the term that provides the bias for determining that the third set of test cases is to be generated based on one of the first set and the second set of test cases may less than one. The method may further include: automatically testing the web service a first time using the third set of test cases; automatically generating third learning data regarding the testing performed the first time using the third set of test cases; automatically testing the web service a second time using the third set of test cases; automatically generating fourth learning data regarding the testing performed the second time using the third set of test cases; automatically determining at least in part based on the third and the fourth learning data whether a fourth set of test cases is to be generated; and responsive to determining that the fourth set of test cases is to be generated, automatically generating the fourth set of test cases. The method may further include: calculating the sum of a plurality of test metrics included in the third learning data; calculating the sum of a plurality of test metrics included in the fourth learning data; comparing the sum of the plurality of test metrics included in the third learning data to the sum of the plurality of test metrics included in the fourth learning data, wherein a result of the comparing is used to determine whether the fourth set of test cases is to be generated. The method may further include: calculating the sum of a plurality of test metrics included in the fourth learning data; and calculating the variance of the sum of the plurality of test metrics included in the fourth learning data, wherein the variance is used to determine whether the fourth set of test cases is to be generated. The method may further include: configuring an endpoint used to communicate with the web service, wherein the web service metadata is obtained from the web service via endpoint. The method may further include: receiving an indication of a Uniform Resource Locator (URL) associated with the web service, wherein the endpoint is configured using the URL. The method may further include: receiving an indication of a data communications protocol for communicating with the web service, wherein the endpoint is configured using the indication of the data communications protocol.

A system that tests a web service may be summarized as including: at least one processor; at least one processor-readable storage medium communicably coupled to the at least one processor, the at least one processor-readable storage medium storing instructions that, when executed by the at least one processor, cause the system to: obtain web service metadata from the web service; automatically generate a first set of test cases at least in part based on the web service metadata obtained from the web service; automatically test the web service using the first set of test cases; and automatically generate first learning data regarding the first set of test cases.

The first set of test cases may be automatically generated at least in part based on a name of a function included in the web service metadata obtained from the web service. The first set of test cases may be automatically generated at least in part based on a name of a variable included in the web service metadata obtained from the web service. The first set of test cases may be automatically generated at least in part based on a data type of a variable included in the web service metadata obtained from the web service. The first set of test cases may be automatically generated at least in part based on at least one constraint on a variable included in the web service metadata obtained from the web service. The at least one constraint on the variable may include at least one of: a minimum value, a maximum value, and a string length. The instructions, when executed by the at least one processor, may cause the system to: select one of a plurality of predetermined sets of test parameters based on the web service metadata; and select a plurality of test parameters from the selected one of the plurality of predetermined sets of test parameters, wherein the first set of test cases is automatically generated using the selected plurality of test parameters. The instructions, when executed by the at least one processor, may cause the system to: generate a plurality of random numbers, wherein the plurality of test parameters are selected from the selected one of the plurality of predetermined sets of test parameters using the plurality of random numbers. The instructions, when executed by the at least one processor, may cause the system to: select one of a plurality of heuristic algorithm modules based on the web service metadata; and obtain a plurality of test parameters using the selected one of the plurality of heuristic algorithm modules, wherein the first set of test cases is automatically generated using the obtained plurality of test parameters. The instructions, when executed by the at least one processor, may cause the system to: generate a plurality of random numbers, wherein the selected one of the plurality of heuristic algorithm modules obtains the plurality of test parameters using the plurality of random numbers. The instructions, when executed by the at least one processor, may cause the system to: automatically generate a second set of test cases at least in part based on the web service metadata obtained from the web service; automatically test the web service using the second set of test cases; automatically generate second learning data regarding the second set of test cases; automatically determine, at least in part based on the first and the second learning data, whether a third set of test cases is to be generated at least in part based on the first or the second set of test cases; responsive to determining that the third set of test cases is to be generated at least in part based on the first set of test cases, automatically generate the third set of test cases at least in part based on the first set of test cases; and responsive to determining that the third set of test cases is to be generated at least in part based on the second set of test cases, automatically generate the third set of test cases at least in part based on the second set of test cases. The first learning data may be generated by associating each test case of the first set of test cases with at least one respective test metric, and the second learning data may be generated by associating each test case of the second set of test cases with at least one respective test metric, and the third set of test cases may be generated at least in part based on the first or the second learning data. The first learning data may be generated by associating each test case of the first set of test cases with at least one respective first code coverage metric and at least one respective first execution time metric, the second learning data may be generated by associating each test case of the second set of test cases with at least one respective second code coverage metric and at least one respective second execution time metric, and the third set of test cases may be generated at least in part based on the first or the second learning data. The instructions, when executed by the at least one processor, may cause the system to: evaluate energy selection logic using the first and the second learning data, wherein a result of evaluating the energy selection logic is used to the determine whether the third set of test cases is to be generated using the first or the second set of test cases. The instructions, when executed by the at least one processor, may cause the system to: calculate the sum of a plurality of test metrics associated with the first set of test cases; calculate the sum of a plurality of test metrics associated with the second set of test cases; and calculate a ratio that includes the sum of the plurality of test metrics associated with the first set of test cases and the sum of the plurality of test metrics associated with the second set of test cases, wherein the energy selection logic is evaluated using the calculated ratio. The instructions, when executed by the at least one processor, may cause the system to: calculate the reciprocal of the sum of a plurality of test metrics associated with the first set of test cases; calculate the reciprocal of the sum of a plurality of test metrics associated with the second set of test cases, wherein the ratio also includes the reciprocal of the sum of the plurality of test metrics associated with the first set of test cases and the reciprocal of the sum of the plurality of test metrics associated with the second set of test cases. The instructions, when executed by the at least one processor, may cause the system to: multiply the ratio by a term that provides a bias for determining that the third set of test cases is to be generated based on one of the first set and the second set of test cases. The magnitude of the term that provides the bias for determining that the third set of test cases is to be generated based on one of the first set and the second set of test cases may be less than one. The instructions, when executed by the at least one processor, may cause the system to: automatically test the web service a first time using the third set of test cases; automatically generate third learning data regarding the testing performed the first time using the third set of test cases; automatically test the web service a second time using the third set of test cases; automatically generate fourth learning data regarding the testing performed the second time using the third set of test cases; automatically determine at least in part based on the third and the fourth learning data whether a fourth set of test cases is to be generated; and responsive to determining that the fourth set of test cases is to be generated, automatically generate the fourth set of test cases. The instructions, when executed by the at least one processor, may cause the system to: calculate the sum of a plurality of test metrics included in the third learning data; calculate the sum of a plurality of test metrics included in the fourth learning data; and compare the sum of the plurality of test metrics included in the third learning data to the sum of the plurality of test metrics included in the fourth learning data, wherein a result of comparing the sum of the plurality of test metrics included in the third learning data to the sum of the plurality of test metrics included in the fourth learning data is used to determine whether the fourth set of test cases is to be generated. The instructions, when executed by the at least one processor, may cause the system to: calculate the sum of a plurality of test metrics included in the fourth learning data; and calculate the variance of the sum of the plurality of test metrics included in the fourth learning data, wherein the variance is used to determine whether the fourth set of test cases is to be generated. The instructions, when executed by the at least one processor, may cause the system to: configure an endpoint used to communicate with the web service, wherein the web service metadata is obtained from the web service via endpoint. The instructions, when executed by the at least one processor, may cause the system to: receive an indication of a Uniform Resource Locator (URL) associated with the web service, wherein the endpoint is configured using the URL. The instructions, when executed by the at least one processor, may cause the system to: receive an indication of a data communications protocol for communicating with the web service, wherein the endpoint is configured using the indication of the data communications protocol.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 1:
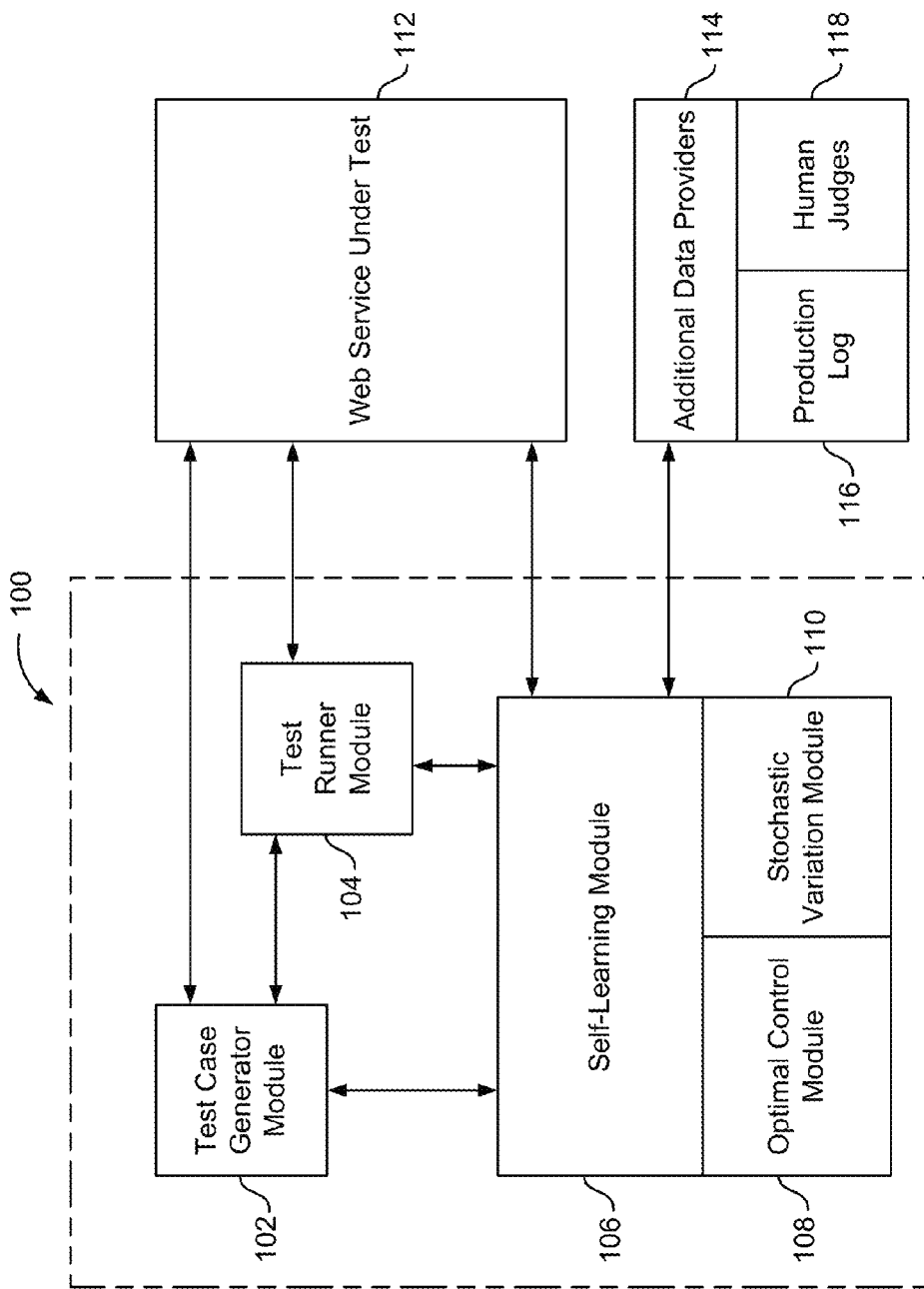
FIG. 1 is a block diagram of a web services integration testing system, according to one embodiment.
Figure 2A:
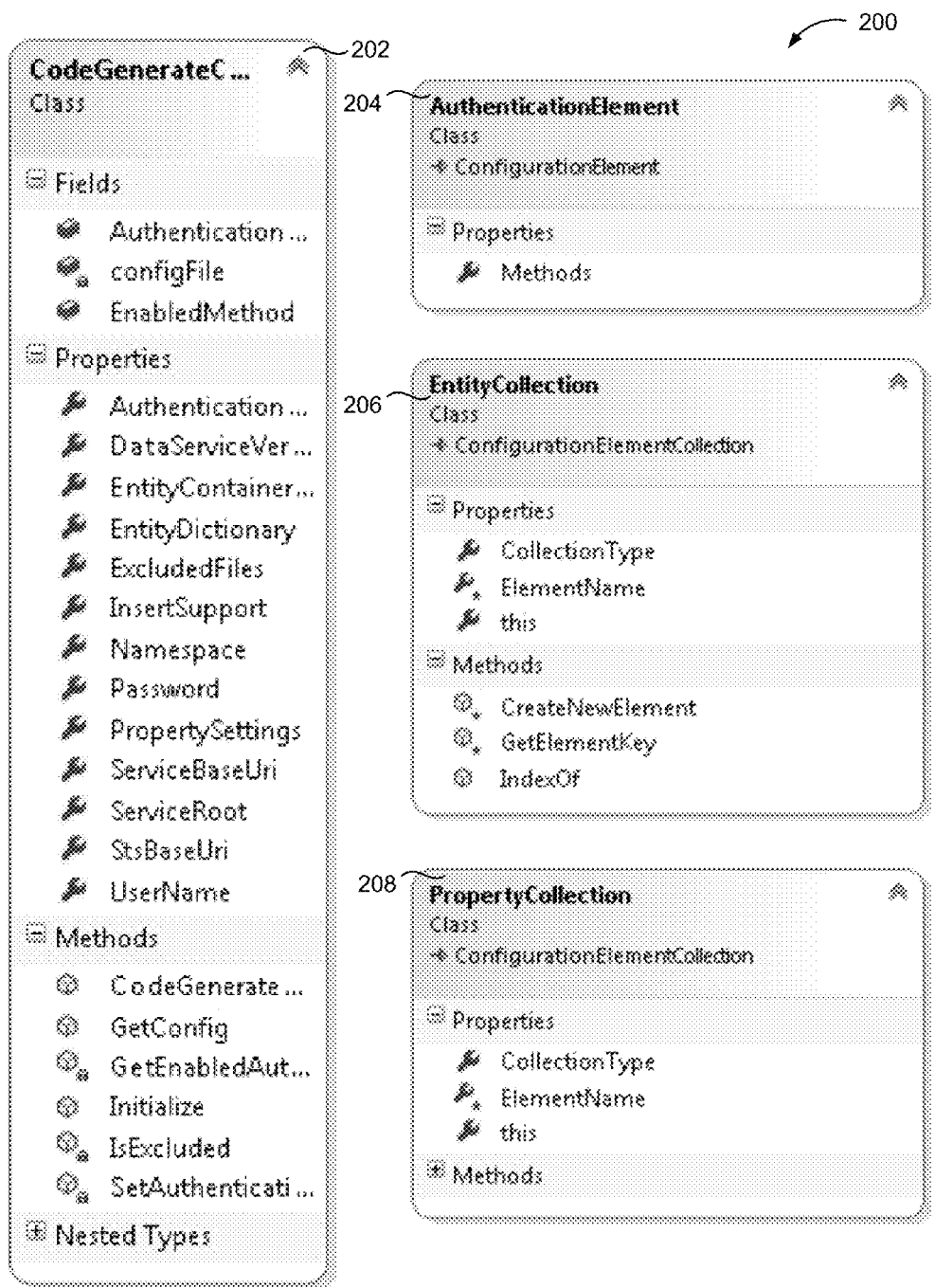
FIGS. 2A-2D illustrate a class diagram of a web services integration testing system, according to one embodiment.
Figure 2B:
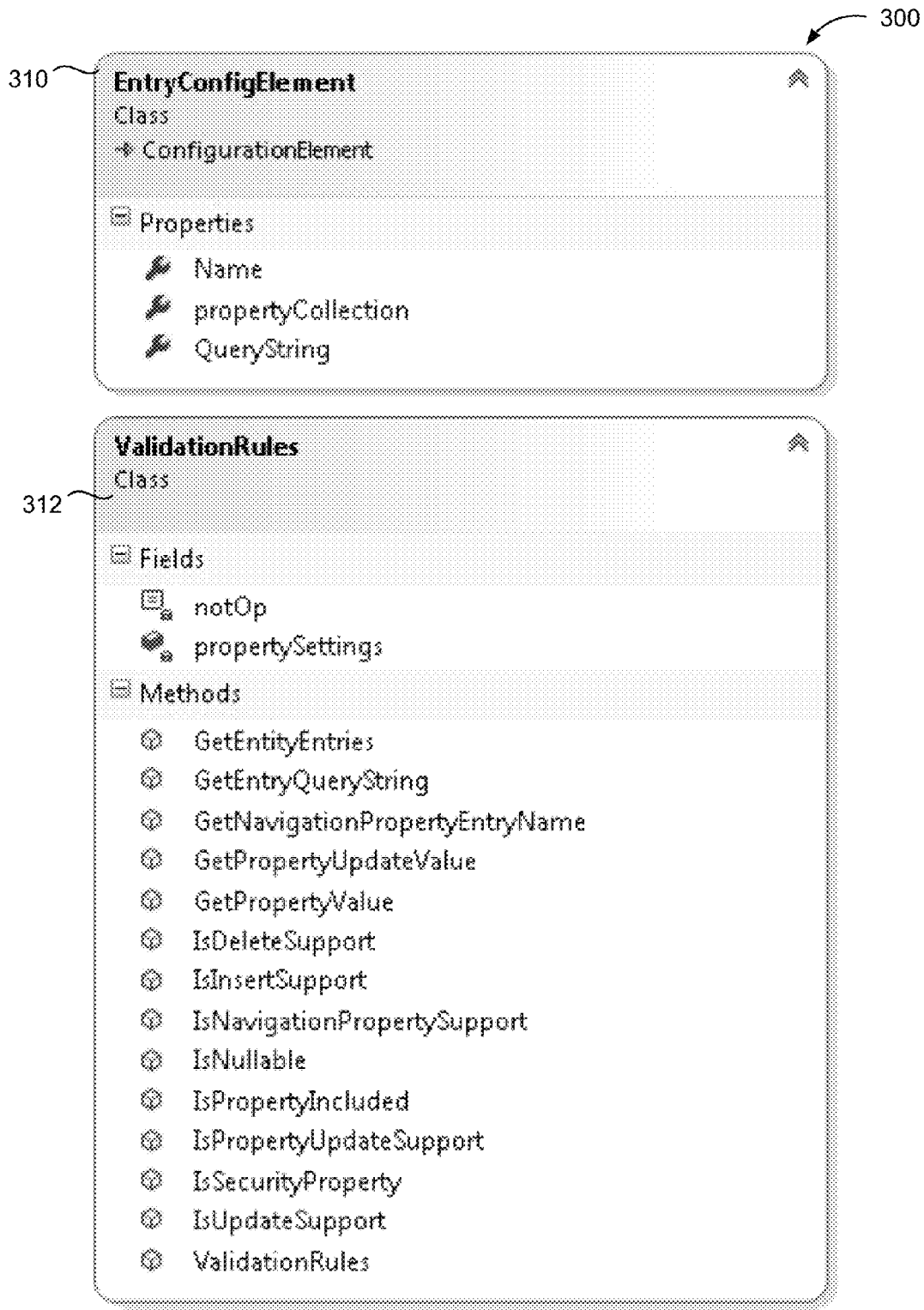
Figure 2C:
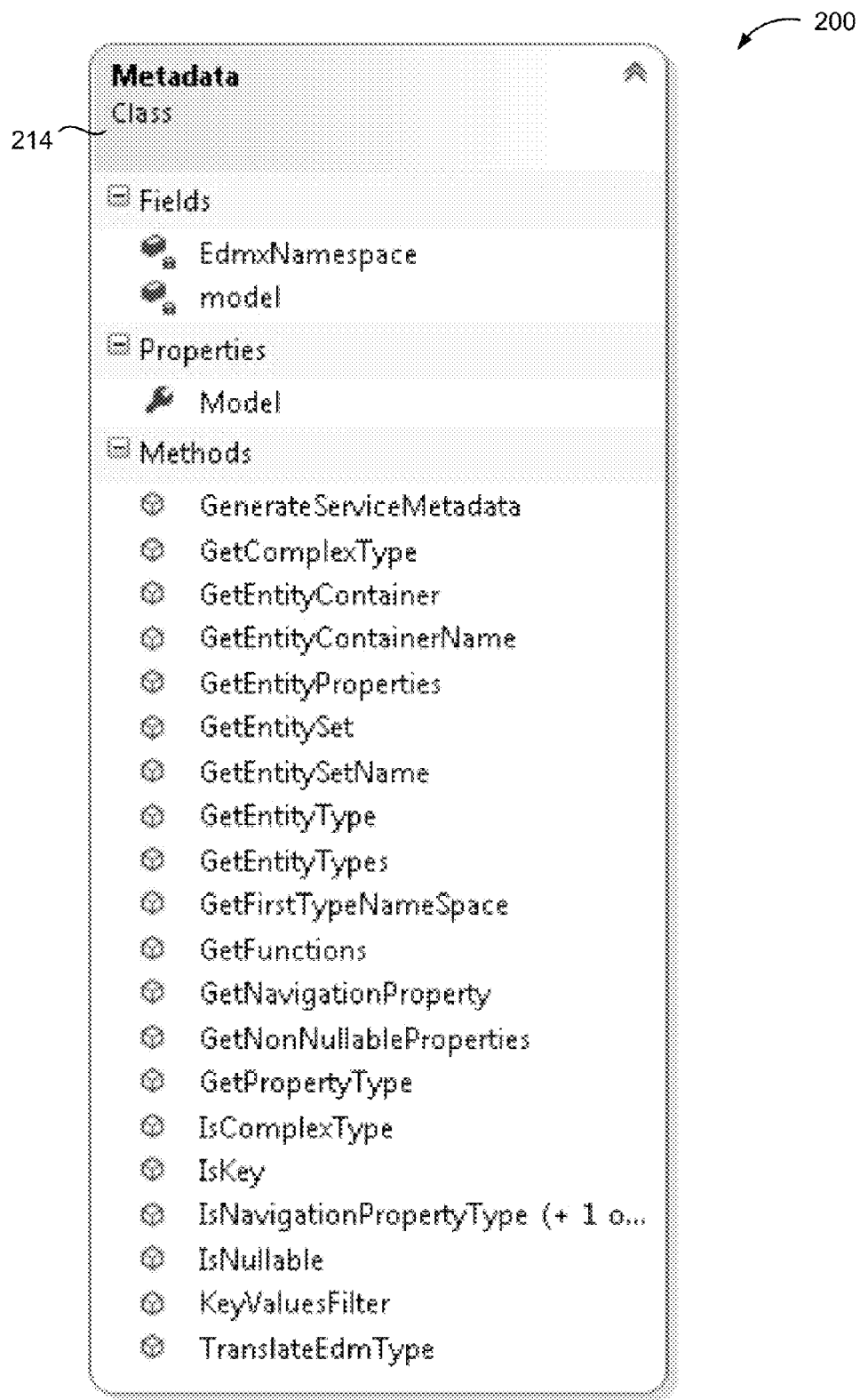
Figure 2D:
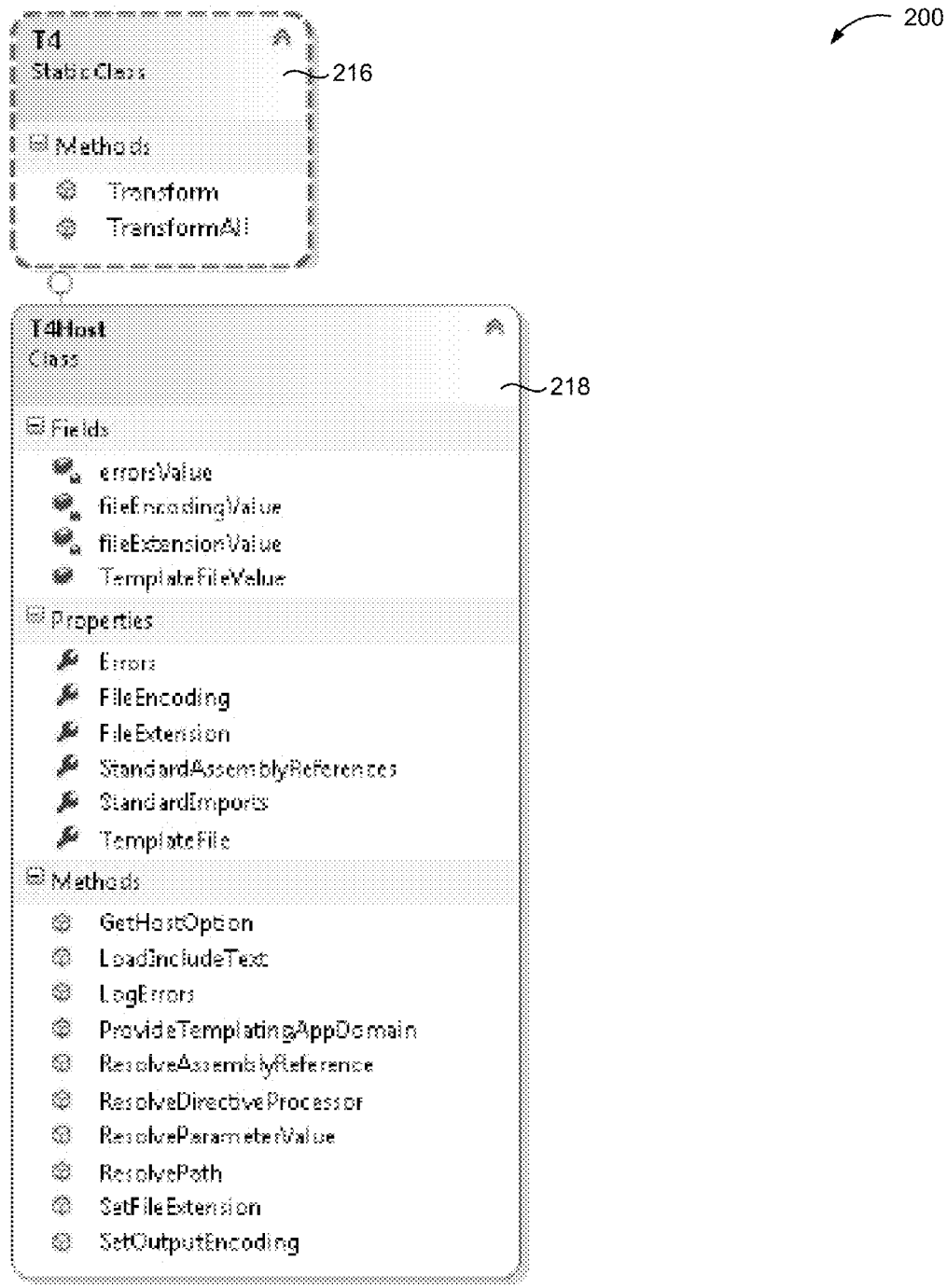

FIG. 1 is a block diagram of a Web Services Integration Testing System 100, according to one embodiment. The Web Services Integration Testing System 100 includes a Test Case Generator Module 102, a Test Runner Module 104, a Self-Learning Module 106, an Optimal Control Module 108, and a Stochastic Variation Module 110.

The Web Services Integration Testing System 100 communicates with a Web Service Under Test 112 via a communications network, for example, a system bus, a wireless local area network (WLAN), a local area network (LAN), or a wide area network (WAN). The Web Services Integration Testing System 100 requests and receives web service metadata from the Web Service Under Test 112, for example, using a conventional web service metadata exchange protocol. The Stochastic Variation Module 110 generates or selects test parameters using the web service metadata received from the Web Service Under Test 112, configurable heuristic algorithm modules, and/or stochastic processes.

More particularly, the Stochastic Variation Module 110 includes computer-executable instructions for generating or selecting test parameters using the web service metadata, configurable heuristic algorithm modules, predetermined test parameters, and stochastic processes. The Stochastic Variation Module 110 may parse the web service metadata using keywords, which may be based on a particular type of the web service metadata (e.g., OData or GData), to identify web service information that is used to generate test parameters. The Stochastic Variation Module 110 may parse the web service metadata to identify function(s), function names(s), input variable name(s), input variable data type(s), and/or constraint(s) on input variable(s). The Stochastic Variation Module 110 uses results of the parsing to select heuristic algorithm modules that are then used to select or generate test parameters.

For example, the Stochastic Variation Module 110 may parse the web service metadata and determine that the Web Service Under Test 112 includes a function that takes as input a first variable of type "String" named "Name" having a maximum string length of 255 characters, a second variable of type "String" named "Address" having a maximum string length of 255 characters, and a third variable of type "Int32" named "ID" having a value that is between 1 and 1000. The Stochastic Variation Module 110 then uses one or more heuristic algorithm modules that are logically associated with string variables to generate a set of test parameters for the variables named "Name" and "Address" and one or more heuristic algorithm modules that are logically associated with integer variables to generate a set of test parameters for the variable named "ID".

The Stochastic Variation Module 110 may associate a first heuristic algorithm module with string variables having names that include the word "name". The first heuristic algorithm module may sequentially select or employ a first stochastic process to randomly select a number of test parameters from a first predetermined set of test parameters associated with string variables having names that include the word "name". If the first predetermined set of test parameters includes 100 predetermined test parameters, the first heuristic algorithm module may cause the first stochastic process to generate random numbers that are uniformly distributed between 0 and 99. For example, the first heuristic algorithm module may use a stochastic process included in the Microsoft C# "Random" class to generate three random numbers: 23, 47, and 78, and then use those random number to select test parameters from the first predetermined set of test parameters having indices of: 23, 47, and 78 for inclusion in a set of test parameters for the variable named "Name".

The Stochastic Variation Module 110 also may associate a second heuristic algorithm module with string variables having names that include the word "address". The second heuristic algorithm module may employ a second stochastic process to randomly select a number of test parameters from a second predetermined set of test parameters associated with string variables having names that include the word "address". If the second predetermined set of test parameters includes 200 test parameters, the second heuristic algorithm module may cause the second stochastic process to generate random numbers uniformly distributed between 0 and 199. For example, the second stochastic process may generate three random variables: 29, 141, and 154, and the second heuristic algorithm module may select the $29^{th}$, $141^{st}$, and $154^{th}$ test parameters from the second predetermined set of test parameters for inclusion in a set of test parameters for the variable named "Address".

Additionally, the Stochastic Variation Module 110 may associate a third heuristic algorithm module with integer variables that have defined minimum and maximum values. For example, the third heuristic algorithm module may cause the Stochastic Variation Module 110 to generate a set of test parameters that include the following values: (i) one minus the minimum value, (i) the minimum value, (iii) one plus the minimum value, (iv) the average of the minimum and the maximum values, (v) one minus the maximum value, (vi) the maximum value, and (vii) one plus the maximum value.

The third heuristic algorithm module also may employ a third stochastic process to generate test parameters in a number of ranges. For example, a first range may be defined as the minimum value minus 1000 through the minimum value minus two; a second range may be defined as the average of the minimum and the maximum values plus and minus ten percent of the difference between the maximum and the minimum values; a third range may be defined as the maximum value plus two through the maximum value plus 1000. The third heuristic algorithm module may employ the third stochastic process to generate test parameters in each of those ranges. Additionally, the third heuristic algorithm module may include rules for altering those ranges. For example, one such rule may cause the third heuristic algorithm module to expand the first range to include the minimum value minus 10,000 through the minimum value minus two after the third heuristic algorithm module has generated 100 test parameters for a particular variable.

The Stochastic Variation Module 110 implements a Markov chain for each input variable of each function of the Web Service Under Test 112. A Markov chain can be represented as shown in Equation 1.

$$Pr(X_{n+1}=x|X_1=x_1, X_2=x_2, \ldots, X_n=x_n) = Pr(X_{n+1}=x|X_n=x_n) \quad \text{Equation 1}$$

The possible values of $X_i$ form a finite variation of test parameters that form the state space of the Markov chain. The state space of the Markov chain for each variable may be characterized using a model implemented by a heuristic algorithm module which uses predetermined rules to generate "best guesses" for values of test parameters. In between rounds of testing, such a heuristic algorithm module may generate a new set of test parameters for a variable corresponding to $X_i$. Then, based on feedback data obtained from a system hosting the Web Service Under Test 112, for example, the state of $X_i$ is accepted or rejected.

The probability of making a transition from a current state s to a new candidate state s' is defined by an acceptance probability function P(s, s', T) that depends on the energies e=E(s) and e'=E(s') of the two states, and on a global time-varying parameter T called the temperature. P(s, s', T) may be defined such that a state with a larger energy is more desirable than a state with a smaller energy, or such that a state with a smaller energy is more desirable than a state with a larger energy. Equation 2 shows an example of energy selection logic for P(s, s', T) wherein a state with a larger energy is more desirable than a state with a smaller energy.

$$P(s, s', T) = \frac{(1+T) * CodeCoverage(s') * ExecutionTime(s')}{CodeCoverage(s) * ExecutionTime(s)} > 1 ? 1 : 0 \quad \text{Equation 2}$$

Because the energy selection logic in Equation 2 is defined such that a state having a larger energy is more desirable than a state having a smaller energy, the quantities Execution Time(s) and ExecutionTime(s') in Equation 2 are reverse or reciprocal execution time metrics. For example, if an execution time metric for the current state s is 2 seconds the reciprocal of the execution time metric (i.e., 0.5) is used for ExecutionTime(s) and, if an execution time metric for the new candidate state s' is 4 seconds, the reciprocal of the execution time metric (i.e., 0.25) is used for ExecutionTime(s') in Equation 2. Accordingly, the reverse execution time metric for the current state s (i.e., 0.5) is larger than the reverse execution time metric for the new candidate state s' (i.e., 0.25), because the execution time metric for the current state s is more desirable than the execution time metric for the new candidate state s' and the energy selection logic is defined such that a state with a larger energy is more desirable than a state with a smaller energy.

The parameter T in Equation 2 prevents the test parameters generated by the Stochastic Variation Module 110 from becoming stuck at a local minimum that is worse than a global minimum. This enables the Stochastic Variation Module 110 to escape a local minimum where all nearby states are inferior but a better state exists through more iteration. When T=0 in Equation 2, an algorithm used to evaluate P(s,s',T) may approximate the greedy algorithm by making transitions to new potential states only when the following ratio is greater than one.

$$\frac{CodeCoverage(s') * ExecutionTime(s')}{CodeCoverage(s) * ExecutionTime(s)}$$

To help ensure that the algorithm used to evaluate P(s,s',T) can escape a local minimum, the algorithm used to evaluate P(s,s',T) and the heuristic algorithm modules used for state candidate generation are well defined, which skews the generator towards candidate test parameter moves where the energy of the new candidate state s' is likely to be similar to that of the current state s.

In that connection, the quantity (1+T) in Equation 2 is defined to be greater than one to provide a bias to a new candidate state s' that has lower energy (i.e., less desirable) than the current state s. For example, the value of T may be selected as 0.01 to provide a slight bias to a new candidate state s' that has slightly lower energy (i.e., slightly less desirable) than the current state s.

Equation 3 shows an example of energy selection logic for P(s,s',T) wherein a state with a smaller energy is more desirable than a state with a larger energy.

$$P(s, s', T) =$$ Equation 3

$$\frac{(1 - T) * CodeCoverage(s') * ExecutionTime(s')}{CodeCoverage(s) * ExecutionTime(s)} < 1 ? 1 : 0$$

Because the energy selection logic in Equation 3 is defined such that a state having a smaller energy is more desirable than a state having a larger energy, the quantities CodeCoverage(s) and CodeCoverage(s') in Equation 3 are reverse or reciprocal code coverage metrics. For example, if a code coverage metric for the current state s is 75% the reciprocal of the code coverage metric (i.e., 1.33) is used for CodeCoverage(s) and, if a code coverage metric for the new candidate state s' is 50%, the reciprocal of the code coverage metric (i.e., 2.0) is used for CodeCoverage(s') in Equation 3. Accordingly, the reverse code coverage metric for the current state s (i.e., 1.33) is smaller than the reverse code coverage metric for the new candidate state s' (i.e., 2.0), because the code coverage metric for the current state s is more desirable than the code coverage metric for the new candidate state s' and the energy selection logic is defined such that a state with a smaller energy is more desirable than a state with a larger energy.

Additionally, the quantity (1−T) in Equation 3 is defined to be less than one to provide a bias to a new candidate state s' that has a higher energy (i.e., less desirable) than the current state s. For example, the value of T may be selected as 0.01 to provide a slight bias to a new candidate state s' that has a slightly higher energy (i.e., slightly less desirable) than the current state s.

Code coverage and execution time are merely two examples of types of metrics that can be optimized by the Stochastic Variation Module 110. The energy selection logic for P(s,s',T) may include other types of metrics. For example, P(s,s',T) can be defined to include a combination of code coverage metrics, such as a combination of statement coverage metrics, decision coverage metrics, condition coverage metrics, path coverage metrics, and covered blocks metrics. Additionally, P(s,s',T) can be defined to include other types of metrics, for example, web server system parameter metrics (e.g., memory utilization metrics), load information metrics (e.g., CPU utilization metrics), network metrics (e.g., network bandwidth metrics), and performance data metrics (e.g., response time metrics).

The Stochastic Variation Module 110 provides the sets of test parameters to the Test Case Generator Module 102. The Test Case Generator Module 102 generates test cases using the test parameters provided by the Stochastic Variation Module 110, the web service metadata provided by the Web Service Under Test 112, and one or more heuristic algorithm modules. For example, if the Test Case Generator Module 102 parses the web service metadata and determines that that the Web Service Under Test 112 implements persistent storage functions (e.g., database functions), the Test Case Generator Module 102 may generate a corresponding set of test cases. For example, the Test Case Generator Module 102 may generate a first test case that attempts to create an entry using a first test parameter, a second test case that attempts to read an entry using a second test parameter, a third test case that attempts to update an entry using a third test parameter, a fourth test case that attempts to delete an entry using a fourth test parameter, and a fifth test case that attempts to perform a search using a sixth test parameter.

The Test Case Generator Module 102 may generate test cases that include Arrange, Act, and Assert (AAA) sections. The Arrange section initializes objects and sets the value of the data that is passed to a function of the Web Service Under Test 112. The Act section invokes the Web Service Under Test 112 with one or more test parameters. The Assert section verifies that the action of the function of the Web Service Under Test 112 test behaves as expected. The Test Case Generator Module 102 provides the test cases to the Test Runner Module 104.

The Test Runner Module 104 performs testing of the Web Service Under Test 112 using the test cases. That is, for each of the test cases, the Test Runner Module 104 invokes a function of the Web Service Under Test 112 described in the web service metadata providing one or more of the test parameters as input, records any data returned by the function, and determines whether the response returned by the function matches an expected response defined for the test case. For example, if a function of the Web Service Under Test 112 is expected to return a particular value, the Test Runner Module 104 verifies that the correct value is returned.

The Test Runner Module 104 also generates test results data that, for each test case, may identify: the test case and the test parameters, a date and time when a test corresponding to the test case was initiated, a date and time when a response from the Web Service Under Test 112 was received (if any), any values included in the response such as results or error codes, and an indication regarding whether the Web Service Under Test 112 passed the test. The Test Runner Module 104 provides the test result data to the Self-Learning Module 106.

The Self-Learning Module 106 generates learning data by associating data with each of the test cases. In addition to the data included in the test results data (e.g., data indicating whether the Web Service Under Test 112 passed or failed a test corresponding to a test case), the Self-Learning Module 106 associates feedback data with each of the test cases. The feedback data may be provided by the Web Service Under Test 112 and the Additional Data Providers 114, including the Production Log 116, and/or the Human Judges 118. Such feedback data may include, for each test case, one or more code coverage metrics, an execution time metric, and/or system performance metrics. The code coverage metrics may include data indicating statement coverage, decision coverage, condition coverage, path coverage, and/or covered blocks. The execution time metric may indicate the amount of time taken to execute a test using a function of the Web Service Under Test 112. The system performance metrics may include data indicating processor utilization, memory utilization, and/or network utilization, for example.

The Human Judges 118 and/or automated software tools running on one or more servers that host the Web Service Under Test 112 may inspect the Production Log 116 and/or other logs, and provide other useful information derived from memory dump data, stack trace data, and/or software environment data to the Self-Learning Module 106. The software development environment data may include data from the Common Language Runtime (CLR) virtual machine component of Microsoft's .NET framework, the Java Runtime Environment (JRE), or a particular language environment (e.g., C++). For example, if the Web Service Under Test 112 terminates abnormally during testing using a test case, memory dump data, stack trace data, and/or software environment data may be analyzed to determine why the test case caused the Web Service Under Test 112 to terminate abnormally. If a test case causes the Web Service Under Test 112 to terminate abnormally, the test case may be associated with data that makes it more likely that the test case would be selected again in futures rounds of testing.

The Self-Learning Module 106 also may associate a test case with data indicating that the test case is deemed to be exceptional. For example, if a code coverage metric associated with a first test case is less than or equal to a first value, the Self-Learning Module 106 may generate learning data in which the first test case is associated with data that makes it less likely the first test case would be selected again for use in future testing. Similarly, if a code coverage metric associated with a second test case is greater than or equal to a second value, the Self-Learning Module 106 may generate learning data in which the second test case is associated with data that makes it more likely the second test case would be selected again for use in future testing. The Stochastic Variation Module 110 may process the learning data and identify test parameters that are deemed to provide exceptionally good code coverage, and randomly select a number of those test parameters for future rounds of testing.

The Optimal Control Module 108 uses the learning data to determine whether the most recently used set of test cases meet one or more acceptability criteria. If the Optimal Control Module 108 determines that the most recently used set of test cases does not meet the acceptability criteria, the Optimal Control Module 108 may instruct the Stochastic Variation Module 110 to generate a new set of test parameters and instruct the Test Case Generator Module 102 to generate a new set of test cases using the new set of test parameters.

If the Optimal Control Module 108 determines that the most recently used set of test cases meets the acceptability criteria, the Optimal Control Module 108 may cause the Test Runner Module 104 to perform testing of the Web Service Under Test 112 using that set of test cases on a regular basis (e.g., daily). The Optimal Control Module 108 monitors the test results data and/or the learning data to determine whether that set of test cases is producing different test results (e.g., lower code coverage or higher execution time), which is indicative of changes to the Web Service Under Test 112. The Web Services Integration Testing System 100 may perform the above process continually such that new tests cases are generated automatically when changes to the Web Service Under Test 112 are detected.

For example, if testing is performed on a daily basis for several weeks using a set of test cases and each time a code coverage metric of 96% is obtained and then testing is performed and a code coverage metric of 81% is obtained, the Optimal Control Module 108 may determine that the Web Service Under Test 112 has changed. In response, the Optimal Control Module 108 may instruct the Stochastic Variation Module 110 to generate a new set of test parameters and instruct the Test Case Generator Module 102 to generate a new set of test cases using the new set of test parameters. By way of another example, if testing is performed on a daily basis for several weeks using a set of test cases and each time an execution time metric of approximately one minute is obtained and then testing is performed and an execution time metric of ten minutes is obtained, the Optimal Control Module 108 may determine that the Web Service Under Test 112 has changed. In response, the Optimal Control Module 108 may instruct the Stochastic Variation Module 110 to generate a new set of test parameters and instruct the Test Case Generator Module 102 to generate a new set of test cases using the new set of test parameters. In that connection, the Optimal Control Module 108 may calculate statistics including a mean and a variance (e.g., standard deviation) for one or more test result metrics (e.g., execution time metrics); if a particular test result metric varies from the mean by more than a predetermined number of standard deviations (e.g., 3), the Optimal Control Module 108 may determine that the web service has changed and cause a new set of test parameters and a new set of test cases to be generated.

In one embodiment, the Web Services Integration Testing System 100 is designed in the Microsoft .NET Framework C# language by utilizing run time Microsoft T4 text templates ('preprocessed' templates) and an XML configuration file system. In Microsoft Visual Studio (VS), a T4 text template is a mixture of text blocks and control logic that can generate a text file. The control logic is written as fragments of program code in Visual C# or Visual Basic. The generated files are C# .cs files with a set of test methods and test fixtures executable by Microsoft Test Manager or VS test runners. Each template is a mixture of the text as it will appear in a generated string, and fragments of program code. The program fragments supply values for the variable parts of the string, and also control conditional and repeated parts. Utilizing a set of T4 templates makes it is easier to see the final form of the output than using a long series of write statements, for example. Additionally, making changes to the output of generated test cases is easier and more reliable.

FIGS. 2A-2D illustrate various portions of a class diagram 200 for the Web Services Integration Testing System 100, according to one embodiment. The class diagram 200 includes a CodeGenerate Class 202, an AuthenticationElement Class 204, an EntityCollection Class 206, a PropertyCollection Class 208, an EntryConfigElement Class 210, a ValidationRules Class 212, a Metadata Class 214, a T4 Static Class 216, and a T4Host Class 218.

Figure 3:
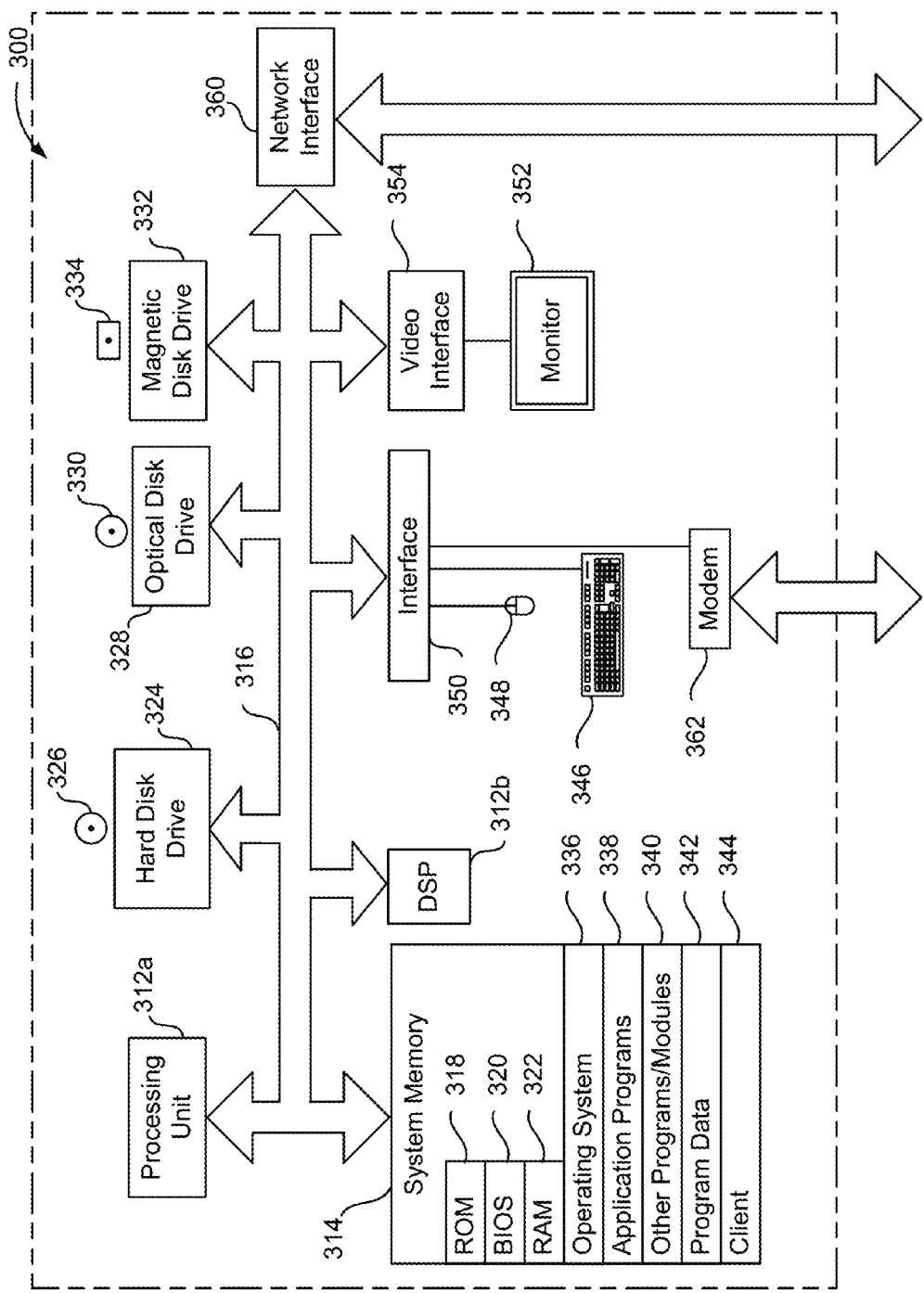
FIG. 3 is a block diagram of a computer system, according to one embodiment.

FIG. 3 shows an example computer system 300, according to one embodiment. The computer system 300 may be used to implement the Web Services Integration Testing System 100. The computer system 300 will at times be referred to in the singular herein, but this is not intended to limit the embodiments to a single device, since in typical embodiments, there may be more than one computer system or device involved. Unless described otherwise, the construction and operation of the various blocks shown in FIG. 3 are of conventional design. As a result, such blocks need not be described in further detail herein, as they will be understood by those skilled in the relevant art.

The computer system 300 may include one or more processing units 312a, 312b (collectively processing unit 312), a system memory 314 and a system bus 316 that couples various system components including the system memory 314 to the processing units 312. The processing units 312 may be any logic processing unit, such as one or more central processing units (CPUs) 312a, digital signal processors (DSPs) 312b, application-specific integrated circuits (ASICs), field programmable gate arrays (FPGAs), etc. The system bus 316 can employ any known bus structures or architectures, including a memory bus with memory controller, a peripheral bus, and a local bus. The system memory 314 includes read-only memory (ROM) 318 and random access memory (RAM) 322. A basic input/output system (BIOS) 320, which can form part of the ROM 318, contains basic routines that help transfer information between elements within the computer system 300, such as during start-up.

The computer system 300 also may include a plurality of interfaces such as a network interface 360 and an interface 350 supporting a modem 362 or any other wireless/wired interfaces.

The computer system 300 may include a hard disk drive 324 for reading from and writing to a hard disk 326, an optical disk drive 328 for reading from and writing to removable optical disks 330, and/or a magnetic disk drive 332 for reading from and writing to magnetic disks 334. The optical disk 330 can be a CD-ROM, while the magnetic disk 334 can be a magnetic floppy disk or diskette. The hard disk drive 324, optical disk drive 328 and magnetic disk drive 332 may communicate with the processing unit 312 via the system bus 316. The hard disk drive 324, optical disk drive 328 and magnetic disk drive 332 may include interfaces or controllers (not shown) coupled between such drives and the system bus 316, as is known by those skilled in the relevant art. The drives 324, 328 and 332, and their associated computer-readable storage media 326, 330, 334, may provide non-volatile and non-transitory storage of computer-readable instructions, data structures, program modules, and other data for the computer system 300.

Although the depicted computer system 300 is illustrated employing the hard disk drive 324, optical disk drive 328, and magnetic disk drive 332, those skilled in the relevant art will appreciate that other types of computer-readable storage media that can store data accessible by a computer may be employed, such as magnetic cassettes, flash memory, Bernoulli cartridges, RAMs, ROMs, smart cards, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory, or any other medium which can be used to store the desired information and which may be accessed by processing unit 312a.

Program modules can be stored in the system memory 314, such as an operating system 336, one or more application programs 338, other programs or modules 340, and program data 342. Application programs 338 may include instructions that cause the processor(s) 312 to generate random numbers, generate test parameters, generate test cases, run tests using the generated test cases, obtain feedback data, generate learning data, and modify the test parameters based on the learning data. Other program modules 340 may include instructions for handling security such as password or other access protection and communications encryption. The system memory 314 also may include communications programs, for example, a Web client 344 for permitting the computer system 300 to access and exchange data with Web servers of the Internet, corporate intranets, extranets, or other networks and devices as described herein, as well as other server applications on server computing systems, such as the Web Service Under Test 112. The program data 342 may store predetermined sets of test parameters, test cases, test results data, learning data, and historical data. The Web client 344 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from Mozilla, Google, and Microsoft.

While shown in FIG. 3 as being stored in the system memory 314, the operating system 336, application programs 338, other programs/modules 340, program data 342, and client 344 can be stored on the hard disk 326 of the hard disk drive 324, the optical disk 330 of the optical disk drive 328 and/or the magnetic disk 334 of the magnetic disk drive 332.

An operator can enter commands and information into the computer system 300 through input devices such as a keyboard 346 and/or a pointing device such as a mouse 348, and/or via a graphical user interface. Other input devices can include a microphone, joystick, game pad, tablet, scanner, etc. These and other input devices are connected to one or more of the processing units 312 through the interface 350 such as a serial port interface that couples to the system bus 316, although other interfaces such as a parallel port, a game port or a wireless interface or a universal serial bus (USB) can be used. A monitor 352 or other display device is coupled to the system bus 316 via a video interface 354, such as a video adapter. The computer system 300 can include other devices, such as speakers, printers, etc.

The computer system 300 can operate in a networked environment using logical connections to one or more remote computers and/or devices described with reference to FIG. 1. For example, the computer system 300 can operate in a networked environment using logical connections to one or more mobile devices, landline telephones and other service providers or information servers. Communications may be via a wired and/or wireless network architecture, for instance wired and wireless enterprise-wide computer networks, intranets, extranets, telecommunications networks, cellular networks, paging networks, and other mobile networks.

It should be understood that the various techniques described herein may be implemented in connection with hardware, software and/or firmware or, where appropriate, with a combination of such. Thus, the methods and apparatuses of the disclosure, or certain aspects or portions thereof, may take the form of program code (i.e., instructions) embodied in tangible media, such as floppy diskettes, CD-ROMs, DVDs, hard drives, flash drives, or any other machine-readable or processor-readable storage medium wherein, when the program code is loaded into and executed by a machine, such as a processor of a computer or mobile device, the machine becomes an apparatus for practicing various embodiments. In the case of program code execution on programmable computers or mobile devices, such generally includes a processor, a storage medium readable by the processor (including volatile and non-volatile memory and/or storage elements), at least one input device, and at least one output device. One or more programs may implement or utilize the processes described in connection with the disclosure, e.g., through the use of an API, reusable controls, or the like. Such programs are preferably implemented in a high level procedural or object-oriented programming language to communicate with a computer system that hosts the Web Service Under Test 112 shown in FIG. 1. However, the program(s) can be implemented in assembly or machine language, if desired. In any case, the language may be a compiled or interpreted language, and combined with hardware implementations.

Figure 4:
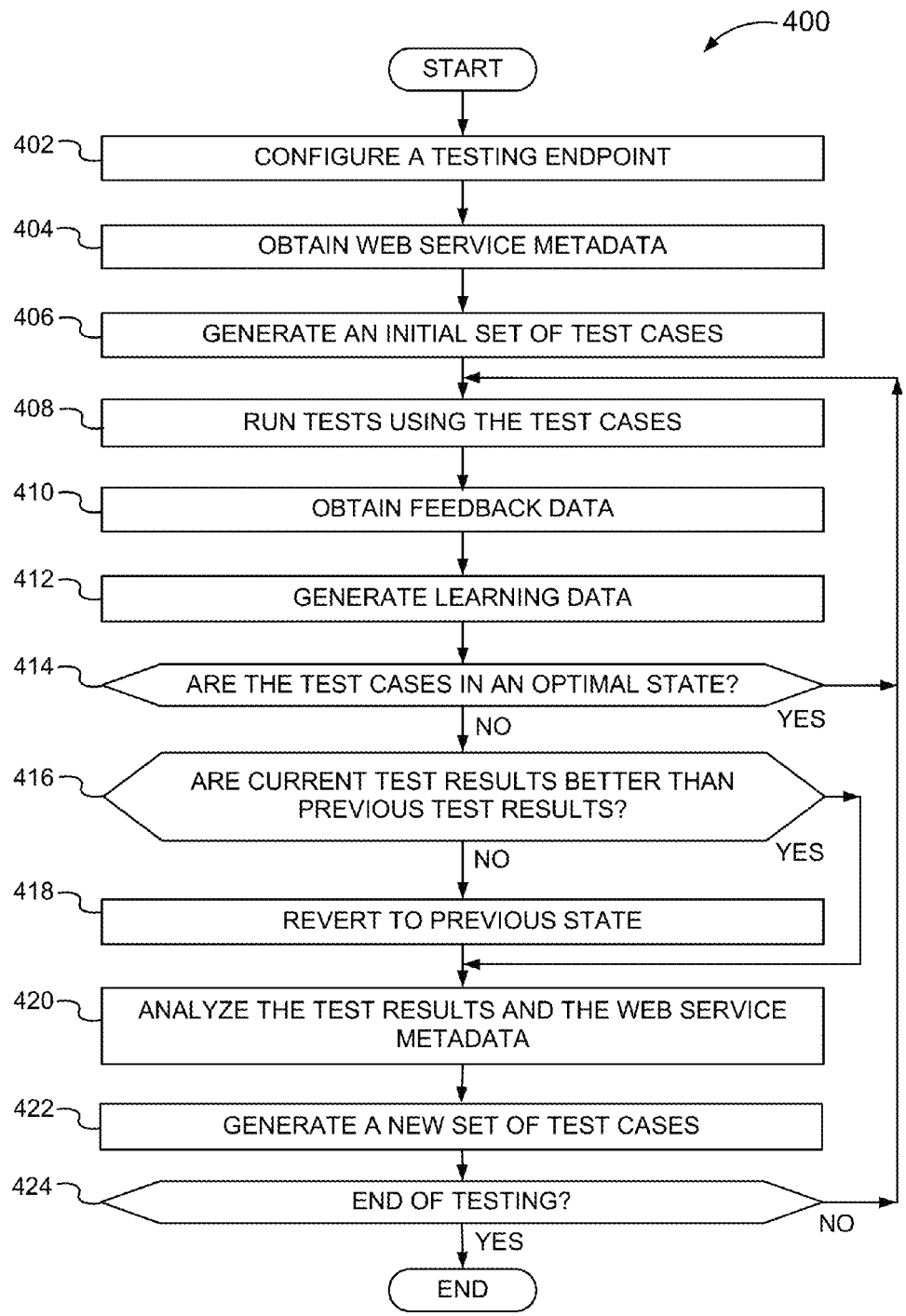
FIG. 4 is a flow chart of a method of performing web services testing, according to one embodiment.

FIG. 4 is a flow chart of a method 400 of operating the Web Services Integration Testing System 100, according to one embodiment. At 402, the web services integration testing system configures an endpoint that is used to communicate with the Web Service Under Test 112.

In one embodiment, the Web Services Integration Testing System 100 configures the endpoint by processing a Windows Communication Foundation (WCF) client configuration file that includes address and binding information for the endpoint. The WCF client file may be created by specifying address information that uniquely identifies the endpoint, for example, a Universal Resource Locator (URL) corresponding to the Web Service Under Test 112, and one or more variables included in the binding information specifying how to communicate with the endpoint, for example, a variable that specifies a transport protocol such as TCP or HTTP.

At 404, the Web Services Integration Testing System 100 obtains web service metadata via the endpoint configured at 402. In one embodiment, the Web Services Integration Testing System 100 obtains the web service metadata using the WS-MetadataExchange (MEX) protocol.

In one embodiment, the Web Services Integration Testing System 100 obtains a Service Metadata Document at 404. The Service Metadata Document describes the data (e.g., structure and organization of all the resources) exposed as HTTP endpoints by the web service. The Service Metadata Document describes data in Entity Data Model (EDM) terms using the Extensible Markup Language (XML) language for describing models called the Conceptual Schema Definition Language (CSDL). When exposed by an OData service as a Service Metadata Document, the CSDL document is packed using the format described in EDMX. An .edmx file is an XML file that defines a model that can be used with Microsoft's Entity Framework (EF). The model is made up of a conceptual model, a storage model, and the mapping between those models. An .edmx file also contains information that is used by the EF Designer to render a model graphically.

At 406, the Web Services Integration Testing System 100 generates an initial set of test parameters for testing the Web Service Under Test 112. The Web Services Integration Testing System 100 may generate the initial set of test parameters by analyzing parameters, structures, and functions of the Web Service Under Test 112 that are described in the web service metadata obtained at 404, and by using one or more heuristic algorithm modules that are selected based on the results of the analyzing.

If the web service metadata is described in EDM terms, the web services integration testing system may parse the metadata and extract data relating to EDM data types. EDM data types may include: Null, Binary, Boolean, Byte, DateTime, Decimal, Double, Single, Guid, Intl 6, Int32, Int64, SByte, String, Time, and DateTimeOffset. If the web services metadata indicates that a function takes as input a variable of type String, the Web Services Integration Testing System 100 may select a heuristic algorithm module associated with string variables to generate the test parameters, for example, as described above in connection with FIG. 1. For example, the application programs 338 may include instructions that cause the processing unit 312 to implement a plurality of heuristic algorithm modules associated with string variables and to select a particular heuristic algorithm module based on the name of a string variable.

More particularly, if the name of a string variable includes "last" or "lname", the Web Services Integration Testing System 100 may select a heuristic algorithm module that generates test parameters for family names, which may include special characters such as apostrophes. If the name of a string variable includes "address" or "addr", the Web Services Integration Testing System 100 may select a heuristic algorithm module that generates postal addresses, which may include a combination of letters and numbers having one or more predetermined formats, for example.

The Web Services Integration Testing System 100 then generates the initial set of test parameters using the selected heuristic algorithm module(s). For example, if the web service metadata obtained at 404 indicates that the Web Service Under Test 112 takes a variable "Name" as input that is of type "String" and that can be from null to 255 characters in length, the selected heuristic algorithm module may cause the Web Services Integration Testing System 100 to generate or select a set of test parameters that includes one or more predetermined control characters (e.g., "^\0"). The Web Services Integration Testing System 100 may store an array of predetermined test parameters for string variables that have been generated based on such rules or heuristic algorithm modules and randomly select a number of test parameters for the initial set of test parameters. For example, the Web Services Integration Testing System 100 may generate the initial set of test parameters by randomly selecting a number of test parameters from a predetermined set of test parameters for string variables that includes: null, " ", "test", "test^\0", "test0", "test1", "test2", etc.

The Web Services Integration Testing System 100 then generates the initial set of test cases using the test parameters included in the initial set of test parameters. For example, each test case includes a string of text that can be processed by Test Runner Module 104 to invoke a function of the Web Service Under Test 112 using one or more test parameters as input. Each test case also may include a result that is expected to be returned by the Web Service Under Test 112 so that a determination can be made as to whether the Web Service Under Test 112 passed a test included in the test case.

At 408, the Web Services Integration Testing System 100 runs tests using the test cases generated at 406. For example, the Test Runner Module 104 runs the tests by sending a plurality of messages via the testing endpoint configured at 402, wherein each message includes one or more of the test parameters generated at 406. That is, the Test Runner Module 104 provides a first message corresponding to a first test case, records any test results data received in response to the first message, and then repeats this process for the remaining test cases. The test message may be formatted according to the Simple Object Access Protocol (SOAP) or the Representational State Transfer (REST) architecture, for example.

At 410, the Web Services Integration Testing System 100 obtains feedback data. The feedback data may include, for each test case, test results metadata indicating an execution time metric and one or more code coverage metrics such as statement coverage data, decision coverage data, condition coverage data, path coverage data, and/or covered blocks data, for example. The feedback data also may include data regarding other parameters that are desired to be optimized, such as server system parameters, load information, performance data. For example, the feedback data may include data regarding CPU utilization, memory usage, memory swapping, memory paging, network latency, network throughput, network bandwidth, and network utilization.

The Web Services Integration Testing System 100 may obtain the feedback data (e.g. via network interface 360) from a computer system that hosts the Web Service Under Test 122. The Web Services Integration Testing System 100 also may obtain additional feedback data from a user (e.g. via keyboard 346).

At 412, the Web Services Integration Testing System 100 generates learning data based on the feedback data obtained at 410. For example, the Self-Learning Module 106 associates each test case used to run the tests at 408 with data indicating: whether the web service provided a response and, if so whether the response was the correct or expected response, one or more code coverage metrics, an execution time metric, whether the test case is deemed to be an outlier case, a CPU utilization metric, a response time metric, a memory utilization metric, and/or a variance of one or more of the foregoing metrics.

At 414, the Optimal Control Module 108 determines whether the tests run at 408 are in an optimal state using the feedback data obtained at 410. The Optimal Control Module 108 may compare values included in the feedback data to predetermined or operator specified threshold values to determine whether the test is in an optimal state. For example, the processing unit 312 may cause code coverage data indicating that a set of test cases resulted in statement coverage of 71% to be compared to a threshold value for minimum statement coverage of 95%, cause execution time data indicating that the set of test cases took 2 minutes to be executed to be compared to a threshold value for maximum execution time of 60 minutes, and then determine that the set of test cases is not in an optimal state based on those comparisons. That is, if the processing unit 312 determines that the set of test cases run at 408 resulted in statement coverage that is less than the threshold value for minimum statement coverage or determines that the execution time of the set of test cases is greater than the threshold value for maximum execution time, the processing unit 312 determines that the set of test cases run at 408 are not in an optimal state.

If the Optimal Control Module 108 determines at 414 that the set of test cases run at 408 are in an optimal state, the Optimal Control Module 108 causes 408 to be repeated using the same set of test cases. For example, the Optimal Control Module 108 may cause the Test Runner Module 104 to run the same set of test cases on a daily/nightly basis. If the Optimal Control Module 108 100 determines at 414 that the set of test cases is not in an optimal state, the method proceeds to 416.

At 416, the Optimal Control Module 108 determines whether current test results are better than previous test results, if any. If tests have been run only once at 408, the Optimal Control Module 108 determines that the current test results are better than previous test results. If tests have been run more than once at 408, the Optimal Control Module 108 uses energy selection logic to determine whether the results for a current set of test cases are better than the results for the previous set of test cases.

For example, the processing unit 312 may evaluate the energy selection logic shown in Equation 3 using a software module stored in the applications programs 338, and a value of the variable T and learning data stored in the program data 342. The learning data is used to calculate values for CodeCoverage(s'), ExecutionTime(s'), CodeCoverage(s), and ExecutionTime(s). For example, the processing unit 312 may calculate the value for ExecutionTime(s) by summing the execution time metrics associated with each test case from the previous set of test cases and calculate the value for ExecutionTime(s') by summing the execution time metrics associated with each test case from the current set of test cases. Additionally, the processing unit 312 may calculate the value for CodeCoverage(s) by taking the reciprocal of the sum of the code coverage metrics associated with each test case from the previous set of test cases and calculate the value for CodeCoverage(s') by taking the reciprocal of the sum of the code coverage metrics associated with each test case from the current set of test cases.

If the calculated value of P(s,s',T) is less than 1, the processing unit 312 determines that the test results for the current set of test cases are better than the test results for the previous set of test cases and confirms the current state. For example, the processing unit 312 causes the current set of test cases to be copied to an area of memory reserved for test cases that will be used to generate the next set of test cases, or otherwise causes the current set of test cases to be associated with the current state. If the calculated value of P is not less than 1, the processing unit 312 determines that the test results for the current set of test cases are not better than the test results for the previous set of test cases and the method proceeds to 418.

At 418, the Web Services Integration Testing System 100 reverts to the previous state. For example, the processing unit 312 causes the previous set of test cases to be copied to an area of memory reserved for test cases that will be used to generate the next set of test cases, or otherwise causes the previous set of test cases to be associated with the current state. The method then proceeds to 420.

At 420, the Web Services Integration Testing System 100 analyzes the learning data and determines which of the test cases associated with the current state are providing acceptable test results and which test parameters need to be altered. The Web Services Integration Testing System 100 may use the learning data associated with each test case included in the set of test cases associated with the current state to rank the test cases according to execution time and/or code coverage. Test cases that are not highly ranked may be updated with different test parameters.

Additionally or alternatively, the Web Services Integration Testing System 100 may use heuristic algorithm modules to evaluate test parameters included in the test cases associated with the current state. For example, if the test cases associated with the current state are not producing acceptable results and the test parameters used in those test cases were obtained using a heuristic algorithm module, the heuristic algorithm module may be used to identify one or more of the test parameters that are to be changed and to identify one or more of the test parameters that are not to be changed.

At 422, the Web Services Integration Testing System 100 generates a new set of test parameters using the test parameters included in the set of test cases associated with the current state, the results of the analysis performed at 420, the web service metadata, and possibly other inputs (e.g., from an operator). The Web Services Integration Testing System 100 may use the same heuristic algorithm module used at 406 (or a different one) to generate or select additional test parameters for inclusion in the new set of test cases along with the test parameters selected at 420 for inclusion in the new set of test cases. For example, the new set of test cases may include one or more of the test parameters used in test cases associated with the current state that have produced good code coverage metrics in additional to one or more test parameters that have been randomly selected from a predetermined set of test parameters that are associated with a particular type of variable (e.g., string variables). The Test Case Generator Module 102 then generates a new set of test case that include the new set of test parameters.

At 424, the Web Services Integration Testing System 100 determines whether the testing is to be ended. The Web Services Integration Testing System 100 may determine whether the testing is to be ended by checking the value of one or more variables that define a software environment of Web Services Integration Testing System 100. For example, the processing unit 312 may cause the monitor 352 to display a selectable icon that, when selected by an operator causes a first variable to have a predetermined value (e.g., 0). The processing unit 312 may determine that the testing is to be ended when the first variable has the predetermined value. Additionally or alternatively, the processing unit 312 may initialize a second variable to a value of zero when the method is started at 402 and increment the second variable each time tests are run at 408. The processing unit 312 may determine that the testing is to be ended when the second variable has a predetermined value (e.g., 1,000). In such a case, the processing unit 312 may cause a message to be generated and displayed via the monitor 352, or sent via the network interface 360. For example, the processing unit 312 may cause an e-mail message to be sent to a system administrator indicating that the Web Service Under Test 112 has been tested using 1,000 sets of test cases and an optimal state has not been reached. In response, the system administer may modify the test parameters and cause the process to be resumed.

If the Web Services Integration Testing System 100 determines at 424 that testing is to be ended, the method ends. If Web Services Integration Testing System 100 determines at 424 that testing is not to be ended, the method returns to 408 and testing is performed using the new set of test cases generated at 422.

Figure 5:
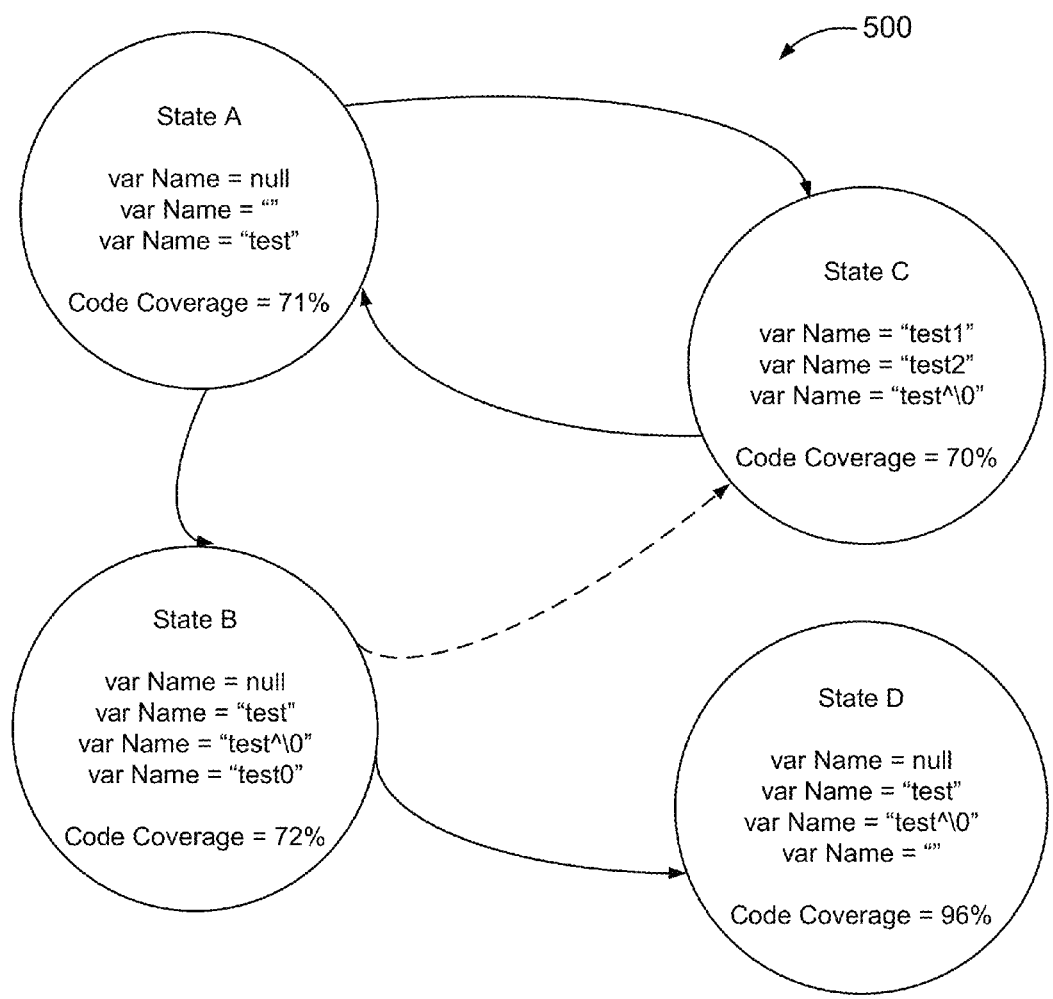
FIG. 5 is an example of a state diagram of a test performed by a web services integration testing system, according to one embodiment.

FIG. 5 is an example of a state diagram 500 of a test performed by the Web Services Integration Testing System 100, according to one embodiment. The state diagram 500 includes States A, B, C, and D, wherein State A is the initial state. For example, the processing unit 312 executes instructions that cause the Web Services Integration Testing System 100 to request, receive, and analyze web service metadata from the Web Service Under Test 112. Additionally, the processing unit 312 executes instructions that cause the Web Services Integration Testing System 100 to generate an initial set of test parameters and to generate an initial set of test cases corresponding to State A using the web service metadata received from the Web Service Under Test 112. Each test case includes a different test parameter for a variable "Name". Each test case also may include an expected result of testing using the test parameter. The test cases generated for State A include the following test parameters: null, " ", and "test". In this example, a function of the Web Service Under Test 112 takes only one variable as input. If the function of the Web Service Under Test 112 could take multiple variables as input, each test case may include multiple test parameters.

The Test Case Generator Module 102 provides the set of test cases corresponding to State A to the Test Runner Module 104, which performs testing of the function of the Web Service Under Test 112 using those test cases. That is, the Test Runner Module 104 invokes the function multiple times, each time providing one of the test parameters as input. The Test Runner Module 104 may generate test result data by associating each test case with an indication regarding whether the Web Service Under Test 112 returned the expected result for the test case, for example. The Test Runner Module 104 provides the test results data to the Self-Learning Module 106.

The Self-Learning Module 106 uses the test results data and other data (e.g., test results metadata) to generate learning data. The Web Service Under Test 112 (or software executing on a system hosting the Web Service Under Test 112) may provide the test results metadata to the Self-Learning Module 106. The test results metadata includes a code coverage metric for each of the test cases. The Self-Learning Module 106 generates the learning data by associating a respective code coverage metric and a respective test result with each of the test cases. The Self-Learning Module 106 also sums the code coverage metrics associated with each of the test cases corresponding to State A and determines that a code coverage metric for State A is 71%.

For simplicity, only one type of metric is discussed in this example (i.e., a code coverage metric) and only four states are shown in FIG. 5. The learning data may associate each test case with more than one code coverage metric (e.g., a statement coverage metric, a decision coverage metric, a condition coverage metric, a path coverage metric, and a covered blocks metric), an execution time metric, and/or metrics for other criteria to be optimized. For example, the learning data may associate each test case with data indicating one or more of the following: a response time metric, a CPU utilization metric, and a memory usage metric. Additionally, the testing may have a different number of states.

The Optimal Control Module 108 determines whether the set of test cases corresponding to State A is in an optimal state. The Optimal Control Module 108 may use a predetermined acceptability criterion of at least 95% code coverage. The Optimal Control Module 108 determines that the test cases corresponding to State A are not in an optimal state because the code coverage metric corresponding to State A (i.e., 71%) is not at least 95%. As a result, the Optimal Control Module 108 instructs the Stochastic Variation Module 110 to generate a new set of test parameters using the test parameters included in the test cases corresponding to State A. For example, the processing unit 312 selects the "test" test parameter included the test cases corresponding to State A and adds numbers and/or control characters according to a heuristic algorithm module. In this example, a new set of test parameters includes: "test1", "test2", and "test^\0".

The Test Case Generator Module 102 then generates a new set of test cases corresponding to State C using the new set of test parameters. The Test Case Generator Module 102 provides the new set of test cases to the Test Runner Module 104, which performs testing of the Web Service Under Test 112 using the test cases. The Test Runner Module 104 generates corresponding test results data and provides it to the Self-Learning Module 106. Additionally, the Web Service Under Test 112 provides corresponding feedback data (e.g., test results metadata) including a code coverage metric for each of the test cases to the Self-Learning Module 106. The Self-Learning Module 106 generates learning data by associating a respective code coverage metric and a respective code test result with each of the test cases. The Self-Learning Module 106 also sums the code coverage metrics associated with each test case included in the set of test cases corresponding to State C and determines that a code coverage metric for State C is 70%.

The Optimal Control Module 108 determines whether the set of test cases corresponding to State C is in an optimal state. The Optimal Control Module 108 determines that the test cases corresponding to State C are not in an optimal state because the code coverage metric corresponding to State C (i.e., 70%) is not at least 95%. The Optimal Control Module 108 then determines whether the test results for the current state (i.e., State C) are better than the results test for the previous state (i.e., State A). For example, the Optimal Control Module 108 evaluates Equation 4 with T equal to 0.01, CodeCoverage(s) equal to the reverse code coverage metric for State A, and CodeCoverage(s') equal to the reverse code coverage metric for State C.

$$P(s, s', T) = \frac{(1-T) * CodeCoverage(s')}{CodeCoverage(s)} < 1 ? 1 : 0 \quad \text{Equation 4}$$

More particularly, the Optimal Control Module 108 first determines that (1−0.01)*(1/0.70)/(1/0.71)=1.004. Because 1.004 is not less than 1, the Optimal Control Module 108 determines that P(s,s',T)=0. That is, the Optimal Control Module 108 determines that the test results for State C are not better than the results test for the previous state (i.e., State A). Accordingly, the Optimal Control Module 108 causes the current state to revert back to State A, and instructs the Stochastic Variation Module 110 to generate a new set of test parameters based on the test parameters corresponding to State A. The new set of test parameters include: null, "test", "test\0", and "test0".

The Test Case Generator Module 102 then generates four test cases corresponding to State B. The Test Case Generator Module 102 provides the test cases to the Test Runner Module 104, which performs testing of the Web Service Under Test 112 using the test cases. The Test Runner Module 104 generates and provides corresponding test results data to the Self-Learning Module 106. Additionally, the Web Service Under Test 112 provides corresponding feedback data including a code coverage metric for each of the test cases to the Self-Learning Module 106. The Self-Learning Module 106 generates learning data by associating each of the test cases with a respective code coverage metric. The Self-Learning Module 106 also sums the code coverage metrics associated with each test case included in the set of test cases corresponding to State B and determines that a code coverage metric for the set of test cases corresponding State B is 72%.

The Optimal Control Module 108 determines whether the set of test cases corresponding to State B is in an optimal state. The Optimal Control Module 108 determines that the test cases corresponding to State B are not in an optimal state because the code coverage metric corresponding to State B (i.e., 72%) is not at least 95%. The Optimal Control Module 108 then determines whether the test results for the current state (i.e., State B) are better than the results test for the previous state (i.e., State A) using Equation 4.

More particularly, the Optimal Control Module 108 determines that (1−0.01)*(1/0.72)/(1/0.71)=0.977. Because 0.977 is less than 1, the Optimal Control Module 108 determines that P(s,s',T)=1. That is, the Optimal Control Module 108 determines that the test results for the current state (i.e., State B) are better than the results test for the previous state (i.e., State A). Accordingly, the Optimal Control Module 108 confirms the current state as State B, and instructs the Stochastic Variation Module 110 to generate a new set of test parameters based on the test parameters corresponding to State B.

The Stochastic Variation Module 110 then generates a new set of test parameters using the test parameters included in the set of test cases corresponding to State B. The Test Case Generator Module 102 generates a new set of test cases using the new set of test parameters. In this example, the new set of test cases corresponds to State C. The Optimal Control Module 108 evaluates the new set of test cases using historical data (e.g., included in the learning data) and determines that the new set of test cases corresponds to a set of test cases that has been used already for testing. Accordingly, the Optimal Control Module 108 instructs the Stochastic Variation Module 110 to generate another new set of test parameters based on the test parameters included in the test cases corresponding to State B.

The Stochastic Variation Module 110 then generates a new set of test parameters: null, "test", "test\0", and " ". The Test Case Generator Module 102 uses the new set of test parameters to generate a new set of test cases corresponding to State D, which becomes the new current state. The Test Case Generator Module 102 provides the set of test cases corresponding to State D to the Test Runner Module 104, which performs testing of the Web Service Under Test 112 using the test cases. The Test Runner Module 104 generates and provides corresponding test results data to the Self-Learning Module 106. Additionally, the Web Service Under Test 112 provides corresponding feedback data including a code coverage metric for each of the test cases to the Self-Learning Module 106.

The Self-Learning Module 106 generates learning data by associating each of the test cases with a respective code coverage metric. The Self-Learning Module 106 also sums the code coverage metrics associated with each of the test cases corresponding to State D and determines that a code coverage metric for State D is 96%. The Optimal Control Module 108 then determines whether the test cases are in an optimal state. The Optimal Control Module 108 determines that the test cases corresponding to State D are in an optimal state because the code coverage metric corresponding to State D (i.e., 96%) is at least 95%.

The Optimal Control Module 108 instructs the Test Runner Module 104 to perform testing using the test cases corresponding to State D on a regular basis. For example, the Optimal Control Module 108 instructs the Test Runner Module 104 to perform testing using the set of test cases corresponding to State D every day at 3:00 am. Although not illustrated in FIG. 5, if the test results for a subsequent test indicate that the code coverage metric is no longer 95%, the Optimal Control Module 108 determines that changes have been made to the Web Service Under Test 112, instructs the Stochastic Variation Module 110 to generate a new set of test parameters, and instructs the Test Case Generator Module 102 to generate a new set of test cases. The above process if repeated until a new set of test cases is generated that meets the acceptability criteria.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method performed by at least one computer system that tests a web service, the method comprising:
   obtaining web service metadata from the web service;
   automatically generating a first set of test cases at least in part based on the web service metadata obtained from the web service;
   automatically testing the web service using the first set of test cases;
   automatically generating first learning data regarding the first set of test cases by associating each test case of the first set of test cases with at least one respective test metric;
   automatically generating a second set of test cases at least in part based on the web service metadata obtained from the web service;
   automatically testing the web service using the second set of test cases;
   automatically generating second learning data regarding the second set of test cases by associating each test case of the second set of test cases with at least one respective test metric;
   automatically comparing the second learning data to the first learning data;
   automatically determining, at least in part based on the comparison between the first and the second learning data, that a third set of test cases is to be generated at least in part based on which one of the first or the second set of test cases performs worse relative to the other of the first or the second set of test cases;
   responsive to determining that the first set of test cases performs worse relative to the second set of test cases, automatically generating the third set of test cases at least in part based on the first set of test cases, the third set of test cases different from the first set of test cases; and
   responsive to determining that the second set of test cases performs worse relative to the first set of test cases, automatically generating the third set of test cases at least in part based on the second set of test cases, the third set of test cases different from the second set of test cases.

2. The method of claim 1 wherein the first set of test cases is automatically generated at least in part based on a name of a function included in the web service metadata obtained from the web service.

3. The method of claim 1 wherein the first set of test cases is automatically generated at least in part based on a name of a variable included in the web service metadata obtained from the web service.

4. The method of claim 1 wherein the first set of test cases is automatically generated at least in part based on a data type of a variable included in the web service metadata obtained from the web service.

5. The method of claim 1 wherein the first set of test cases is automatically generated at least in part based on at least one constraint on a variable included in the web service metadata obtained from the web service.

6. The method of claim 5 wherein the at least one constraint on the variable includes at least one of: a minimum value, a maximum value, and a string length.

7. The method of claim 1, further comprising:
   selecting one of a plurality of predetermined sets of test parameters based on the web service metadata; and
   selecting a plurality of test parameters from the selected one of the plurality of predetermined sets of test parameters,
   wherein the first set of test cases is automatically generated using the selected plurality of test parameters.

8. The method of claim 7, further comprising:
   generating a plurality of random numbers,
   wherein the plurality of test parameters are selected from the selected one of the plurality of predetermined sets of test parameters using the plurality of random numbers.

9. The method of claim 1 wherein the first learning data is generated by associating each test case of the first set of test cases with at least one respective test metric, and the second learning data is generated by associating each test case of the second set of test cases with at least one respective test metric, and the third set of test cases is generated at least in part based on the first or the second learning data.

10. The method of claim 1 wherein the first learning data is generated by associating each test case of the first set of test cases with at least one respective first code coverage metric and at least one respective first execution time metric, the second learning data is generated by associating each test case of the second set of test cases with at least one respective second code coverage metric and at least one respective second execution time metric, and the third set of test cases is generated at least in part based on the first or the second learning data.

11. The method of claim 1, further comprising:
   evaluating energy selection logic using the first and the second learning data,
   wherein a result of the evaluating of the energy selection logic is used to determine whether the third set of test cases is to be generated using the first or the second set of test cases.

12. The method of claim 11 wherein the evaluating of the energy selection logic includes:
   calculating the sum of a plurality of test metrics associated with the first set of test cases;
   calculating the sum of a plurality of test metrics associated with the second set of test cases; and
   calculating a ratio that includes the sum of the plurality of test metrics associated with the first set of test cases and the sum of the plurality of test metrics associated with the second set of test cases.

13. The method of claim 12 wherein the evaluating of the energy selection logic further includes:
   calculating the reciprocal of the sum of a plurality of test metrics associated with the first set of test cases; and
   calculating the reciprocal of the sum of a plurality of test metrics associated with the second set of test cases,
   wherein the ratio also includes the reciprocal of the sum of the plurality of test metrics associated with the first set of test cases and the reciprocal of the sum of the plurality of test metrics associated with the second set of test cases.

14. The method of claim 13 wherein the evaluating of the energy selection logic further includes:

multiplying the ratio by a term that provides a bias for determining that the third set of test cases is to be generated based on one of the first set and the second set of test cases.

15. The method of claim 14 wherein the magnitude of the term that provides the bias for determining that the third set of test cases is to be generated based on one of the first set and the second set of test cases is less than one.

16. The method of claim 1, further comprising:
automatically testing the web service a first time using the third set of test cases;
automatically generating third learning data regarding the testing performed the first time using the third set of test cases;
automatically testing the web service a second time using the third set of test cases;
automatically generating fourth learning data regarding the testing performed the second time using the third set of test cases;
automatically determining at least in part based on the third and the fourth learning data whether a fourth set of test cases is to be generated; and
responsive to determining that the fourth set of test cases is to be generated, automatically generating the fourth set of test cases.

17. The method of claim 16, further comprising:
calculating the sum of a plurality of test metrics included in the third learning data;
calculating the sum of a plurality of test metrics included in the fourth learning data; and
comparing the sum of the plurality of test metrics included in the third learning data to the sum of the plurality of test metrics included in the fourth learning data,
wherein a result of the comparing is used to determine whether the fourth set of test cases is to be generated.

18. The method of claim 16, further comprising:
calculating the sum of a plurality of test metrics included in the fourth learning data; and
calculating the variance of the sum of the plurality of test metrics included in the fourth learning data,
wherein the variance is used to determine whether the fourth set of test cases is to be generated.

19. The method of claim 1, further comprising:
configuring an endpoint used to communicate with the web service,
wherein the web service metadata is obtained from the web service via endpoint.

20. The method of claim 19, further comprising:
receiving an indication of a Uniform Resource Locator (URL) associated with the web service,
wherein the endpoint is configured using the URL.

21. The method of claim 19, further comprising:
receiving an indication of a data communications protocol for communicating with the web service,
wherein the endpoint is configured using the indication of the data communications protocol.

22. A system that tests a web service, the system comprising:
at least one processor;
at least one processor-readable storage medium communicably coupled to the at least one processor, the at least one processor-readable storage medium storing instructions that, when executed by the at least one processor, cause the system to:
obtain web service metadata from the web service;
automatically generate a first set of test cases at least in part based on the web service metadata obtained from the web service;
automatically test the web service using the first set of test cases;
automatically generate first learning data regarding the first set of test cases by associating each test case of the first set of test cases with at least one respective test metric;
automatically generate a second set of test cases at least in part based on the web service metadata obtained from the web service;
automatically test the web service using the second set of test cases;
automatically generate second learning data regarding the second set of test cases by associating each test case of the second set of test cases with at least one respective test metric;
automatically compare the second learning data to the first learning data;
automatically determine, at least in part based on the comparison between the first and the second learning data, that a third set of test cases is to be generated at least in part based on which one of the first or the second set of test cases performs worse relative to the other of the first or the second set of test cases;
responsive to determining that the first set of test cases performs worse relative to the second set of test cases, automatically generate the third set of test cases at least in part based on the first set of test cases, the third set of test cases different from the first set of test cases; and
responsive to determining that the second set of test cases performs worse relative to the first set of test cases, automatically generate the third set of test cases at least in part based on the second set of test cases, the third set of test cases different from the second set of test cases.

23. The system of claim 22 wherein the first set of test cases is automatically generated at least in part based on a name of a function included in the web service metadata obtained from the web service.

24. The system of claim 22 wherein the first set of test cases is automatically generated at least in part based on a name of a variable included in the web service metadata obtained from the web service.

25. The system of claim 22 wherein the first set of test cases is automatically generated at least in part based on a data type of a variable included in the web service metadata obtained from the web service.

26. The system of claim 22 wherein the first set of test cases is automatically generated at least in part based on at least one constraint on a variable included in the web service metadata obtained from the web service.

27. The system of claim 26 wherein the at least one constraint on the variable includes at least one of: a minimum value, a maximum value, and a string length.

28. The system of claim 22 wherein the instructions, when executed by the at least one processor, cause the system to:
select one of a plurality of predetermined sets of test parameters based on the web service metadata; and
select a plurality of test parameters from the selected one of the plurality of predetermined sets of test parameters,
wherein the first set of test cases is automatically generated using the selected plurality of test parameters.

29. The system of claim 28 wherein the instructions, when executed by the at least one processor, cause the system to:

generate a plurality of random numbers,
   wherein the plurality of test parameters are selected from the selected one of the plurality of predetermined sets of test parameters using the plurality of random numbers.

30. The system of claim 22 wherein the first learning data is generated by associating each test case of the first set of test cases with at least one respective test metric, and the second learning data is generated by associating each test case of the second set of test cases with at least one respective test metric, and the third set of test cases is generated at least in part based on the first or the second learning data.

31. The system of claim 22 wherein the first learning data is generated by associating each test case of the first set of test cases with at least one respective first code coverage metric and at least one respective first execution time metric, the second learning data is generated by associating each test case of the second set of test cases with at least one respective second code coverage metric and at least one respective second execution time metric, and the third set of test cases is generated at least in part based on the first or the second learning data.

32. The system of claim 22 wherein the instructions, when executed by the at least one processor, cause the system to:
   evaluate energy selection logic using the first and the second learning data,
   wherein a result of evaluating the energy selection logic is used to the determine whether the third set of test cases is to be generated using the first or the second set of test cases.

33. The system of claim 32 wherein the instructions, when executed by the at least one processor, cause the system to:
   calculate the sum of a plurality of test metrics associated with the first set of test cases;
   calculate the sum of a plurality of test metrics associated with the second set of test cases; and
   calculate a ratio that includes the sum of the plurality of test metrics associated with the first set of test cases and the sum of the plurality of test metrics associated with the second set of test cases,
   wherein the energy selection logic is evaluated using the calculated ratio.

34. The system of claim 33 wherein the instructions, when executed by the at least one processor, cause the system to:
   calculate the reciprocal of the sum of a plurality of test metrics associated with the first set of test cases; and
   calculate the reciprocal of the sum of a plurality of test metrics associated with the second set of test cases,
   wherein the ratio also includes the reciprocal of the sum of the plurality of test metrics associated with the first set of test cases and the reciprocal of the sum of the plurality of test metrics associated with the second set of test cases.

35. The system of claim 33 wherein the instructions, when executed by the at least one processor, cause the system to:
   multiply the ratio by a term that provides a bias for determining that the third set of test cases is to be generated based on one of the first set and the second set of test cases.

36. The system of claim 35 wherein the magnitude of the term that provides the bias for determining that the third set of test cases is to be generated based on one of the first set and the second set of test cases is less than one.

37. The system of claim 22 wherein the instructions, when executed by the at least one processor, cause the system to:
   automatically test the web service a first time using the third set of test cases;
   automatically generate third learning data regarding the testing performed the first time using the third set of test cases;
   automatically test the web service a second time using the third set of test cases;
   automatically generate fourth learning data regarding the testing performed the second time using the third set of test cases;
   automatically determine at least in part based on the third and the fourth learning data whether a fourth set of test cases is to be generated; and
   responsive to determining that the fourth set of test cases is to be generated, automatically generate the fourth set of test cases.

38. The system of claim 37 wherein the instructions, when executed by the at least one processor, cause the system to:
   calculate the sum of a plurality of test metrics included in the third learning data;
   calculate the sum of a plurality of test metrics included in the fourth learning data; and
   compare the sum of the plurality of test metrics included in the third learning data to the sum of the plurality of test metrics included in the fourth learning data,
   wherein a result of comparing the sum of the plurality of test metrics included in the third learning data to the sum of the plurality of test metrics included in the fourth learning data is used to determine whether the fourth set of test cases is to be generated.

39. The system of claim 37 wherein the instructions, when executed by the at least one processor, cause the system to:
   calculate the sum of a plurality of test metrics included in the fourth learning data; and
   calculate the variance of the sum of the plurality of test metrics included in the fourth learning data,
   wherein the variance is used to determine whether the fourth set of test cases is to be generated.

40. The system of claim 22 wherein the instructions, when executed by the at least one processor, cause the system to:
   configure an endpoint used to communicate with the web service,
   wherein the web service metadata is obtained from the web service via endpoint.

41. The system of claim 40 wherein the instructions, when executed by the at least one processor, cause the system to:
   receive an indication of a Uniform Resource Locator (URL) associated with the web service,
   wherein the endpoint is configured using the URL.

42. The system of claim 40 wherein the instructions, when executed by the at least one processor, cause the system to:
   receive an indication of a data communications protocol for communicating with the web service,
   wherein the endpoint is configured using the indication of the data communications protocol.

* * * * *